United States Patent
Garcia, III et al.

(10) Patent No.: US 10,094,131 B1
(45) Date of Patent: Oct. 9, 2018

(54) VEHICLE VENDING MACHINE

(71) Applicant: Carvana, LLC, Tempe, AZ (US)

(72) Inventors: Ernest C. Garcia, III, Phoenix, AZ (US); Bret Sassenberg, Tempe, AZ (US); Benjamin E. Huston, Phoenix, AZ (US)

(73) Assignee: CARVANA, LLC, Tempe, AZ (US)

( * ) Notice: Subject to any disclaimer, the term of this patent is extended or adjusted under 35 U.S.C. 154(b) by 0 days.

(21) Appl. No.: 15/691,305

(22) Filed: Aug. 30, 2017

Related U.S. Application Data

(60) Provisional application No. 62/381,655, filed on Aug. 31, 2016.

(51) Int. Cl.
*E04H 6/42* (2006.01)
*E04H 6/12* (2006.01)

(52) U.S. Cl.
CPC .............. *E04H 6/424* (2013.01); *E04H 6/12* (2013.01)

(58) Field of Classification Search
None
See application file for complete search history.

(56) References Cited

U.S. PATENT DOCUMENTS

2005/0220594 A1* 10/2005 Haag .................... E04H 6/22
414/529

\* cited by examiner

*Primary Examiner* — Kyle O Logan
(74) *Attorney, Agent, or Firm* — The Marbury Law Group, PLLC

(57) ABSTRACT

Systems, methods, non-transitory processor-readable storage media, and devices of the various embodiments enable a vehicle vending machine to retrieve a vehicle from a storage location and deliver the vehicle to a delivery bay for delivery to a customer. Various embodiments may include a vehicle vending machine including a tower, a robotic carrier, a corridor extending from the tower, a plurality of delivery bays positioned along the corridor, a customer interaction kiosk, and a video system.

19 Claims, 22 Drawing Sheets

US 10,094,131 B1

VEHICLE VENDING MACHINE

RELATED APPLICATIONS

The present application claims the benefit of priority to U.S. Provisional Application No. 62/381,655, entitled "Vehicle Vending Machine" filed Aug. 31, 2016, the entire contents of which are hereby incorporated by reference.

BACKGROUND

Typically the provisioning of vehicles to customers is a space-intensive endeavor requiring large surface parking lots. The process of getting vehicles from the outdoor parking lots to the customers is a labor-intensive process requiring a driver to traverse the distance of the surface parking lot, find the desired vehicle, and drive the vehicle to the customer.

SUMMARY

The systems, methods, non-transitory processor-readable storage media, and devices of the various embodiments enable a vehicle vending machine to retrieve a vehicle from a storage location and deliver the vehicle to a delivery bay for delivery to a customer. Various embodiments may include a vehicle vending machine including a tower, a robotic carrier, a corridor extending from the tower, a plurality of delivery bays positioned along the corridor, a customer interaction kiosk, and a video system.

In some embodiments, the tower may include an exterior door through which vehicles enter the tower for storage and an opening via which a vehicle retrieved from a storage location is placed onto the robotic carrier within the corridor. In some embodiments, the tower may include a lift-able shuttle configured to move a vehicle pallet to and from a storage location within the tower. In some embodiments, the lift-able shuttle may be further configured to lift the vehicle positioned on the vehicle pallet to an appropriate level, to rotate the vehicle pallet to an appropriate orientation, and to place the vehicle positioned on the vehicle pallet in a storage location, in response to a command and after a vehicle is positioned on a vehicle pallet. In some embodiments, the lift-able shuttle may be further configured to retrieve a vehicle positioned on a vehicle pallet from a storage location within the tower, to rotate the vehicle pallet to an appropriate orientation, and to position, via the opening, the vehicle positioned on the vehicle pallet onto the robotic carrier within the corridor.

In some embodiments, the robotic carrier may be configured to receive, via the opening, a vehicle positioned on a vehicle pallet, the vehicle positioned on the vehicle pallet being retrieved from a storage location within the tower, to navigate along the corridor to an appropriate one of the plurality of delivery bays, to rotate the vehicle pallet to an appropriate orientation, and to deliver the vehicle positioned on the vehicle pallet to the appropriate delivery bay. In some embodiments, each of the plurality of delivery bays may include an interior delivery bay door positioned between the respective delivery bay and the corridor through which the robotic carrier delivers a vehicle positioned on a vehicle pallet to the respective delivery bay and an exterior delivery bay door positioned between the respective delivery bay and an exterior of the vehicle vending machine.

In some embodiments, each interior delivery bay door is configured to be opened only when the respective exterior delivery bay door is closed and each exterior delivery bay door is configured to be opened only when the respective interior delivery bay door is closed. In some embodiments, the robotic carrier may be further configured to deliver the vehicle positioned on the vehicle pallet to the appropriate one of the plurality of delivery bays only when the interior delivery bay door of the appropriate delivery bay is opened and the exterior delivery bay door of the appropriate delivery bay is closed.

In some embodiments, the robotic carrier may be further configured to retrieve a vehicle pallet from one of the plurality of delivery bays, navigate along the corridor to the opening of the tower, and position, via the opening, the vehicle pallet onto the lift-able shuttle. In some embodiments, the retrieved vehicle pallet may be empty.

In some embodiments, an exterior delivery bay door positioned between the appropriate delivery bay and an exterior of the vehicle vending machine may be configured to be opened only when an interior delivery bay door positioned between the appropriate delivery bay and the corridor is closed and a customer may retrieve the vehicle from the vehicle pallet within the appropriate delivery bay via the exterior delivery bay door when the exterior delivery bay door is opened.

Further embodiments include a control system for a vehicle vending machine. Further embodiments include a method of operating a vehicle vending machine. Further embodiments include a non-transitory processor-readable storage medium having stored thereon processor-executable software instructions configured to cause a processor of a vehicle vending machine to perform various operations.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
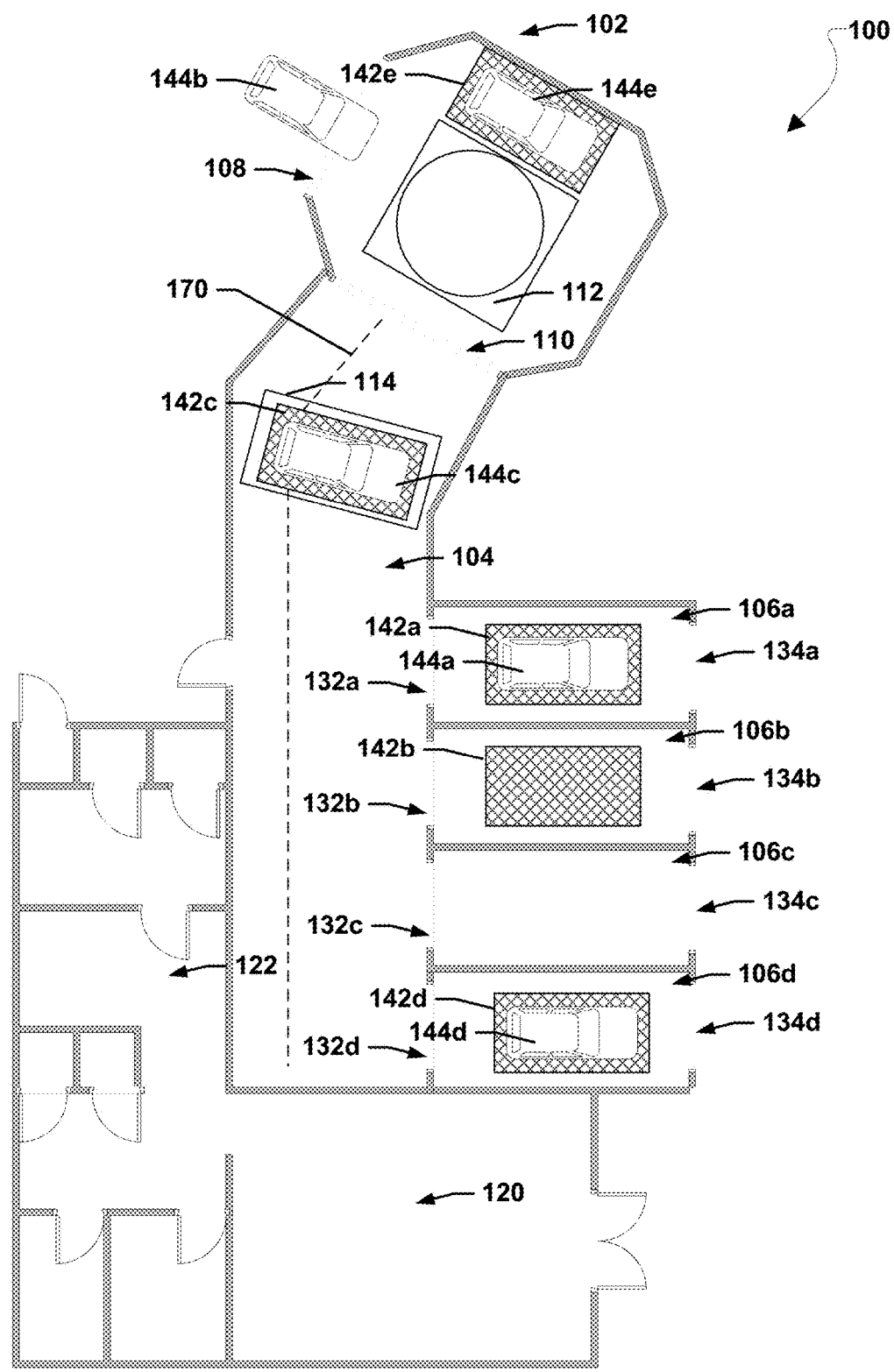
FIG. 1A is a block diagram of an example of a vehicle vending machine according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide systems, methods, devices, and non-transitory media for a vehicle vending machine. In various embodiments, the vehicle vending machine may comprise one or more tower, one or more robotic carrier, one or more bay, one or more customer interaction kiosk, and/or one or more video system.

A vehicle vending machine may be utilized to retrieve a vehicle from a storage location and deliver the vehicle to a customer. In various embodiments, the vehicle may be retrieved from a storage location within a tower and placed on a robotic carrier. The robotic carrier may navigate to an appropriate delivery bay and place the vehicle in the delivery bay. A buyer may complete an authentication process and take delivery of the vehicle from the delivery bay.

The discussions of "cars" used herein are for illustrative purposes of example vehicles suitable for use with the various embodiments. Other vehicles, such as trucks, vans, etc., may be substituted in the various embodiments and the term "car" is not intended to limit the various embodiments.

Loading the Tower

In various embodiments, the tower may be loaded from a door in the tower itself. The car may be driven from outside the tower onto a ramp that leads up to the tower and through the door at the base of the tower. There may be a hydraulic powered lift gate that bridges the gap between the doorway and a vehicle pallet. This vehicle pallet may be attached to a lift-able shuttle in an atrium at the center of the tower. Once the car is set in the middle of the pallet, a command may be sent to the tower directing it to lift to the appropriate level. In the preferred embodiment, there may be five levels with four cars each, except for the bottom level which only has two. In other embodiments, less levels or more levels may be used. After the pallet is lifted up to the appropriate level, it may be rotated to the correct orientation. The pallet, which may be secured to the arms of the shuttle lift, may be pushed in to its assigned position in the tower. Once the pallet is in position, the arms may disengage from the pallet.

In various embodiments, the lifting mechanism may use chains that run up the side of the towers, as well as a counterbalancing system with weights. Other lifting mechanisms, including hydraulics or gears, may also be used.

Retrieving a Vehicle from the Tower

In various embodiments, the process for retrieving a vehicle from the tower may be similar to the system for loading a vehicle into the tower. A command may be sent to the shuttle identifying the storage slot where the desired vehicle is located. The command may be sent from a processor of a control system. The shuttle may be lifted up to the level of the identified storage slot. The shuttle may be rotated to orient itself to be aligned with the storage slot. Arms from the tower may hook onto the desired pallet and then lift the pallet clear of metal pegs which engage the pallet. The pallet may be transposed to be over the shuttle and the pallet may be lowered onto the shuttle. The shuttle may then be lowered to the lowest level, and rotated to orient itself with an entrance to an internal alleyway or corridor. An automatic robotic carrier may wait in the alleyway. Once the shuttle is on the lowest level and aligned with the robotic carrier, the pallet may be pushed from the shuttle onto the robotic carrier. Once in place, the arms may disconnect from the pallet. The robotic carrier also may have metal pegs that engage holes in the pallet, securing the pallet in place.

The Robotic Carrier

In various embodiments, the robotic carrier may move on wheels. The robotic carrier may include a computer with a pre-programmed model of the alleyway dimensions and the robotic carrier may use lasers to locate reflective tape placed on the walls of the alleyway to determine the robotic carrier's location within the model. The robotic carrier may receive a message directing the robotic carrier to one of the delivery or customer pick-up bays. In a preferred embodiment, there may be three bays, although there may be any number of bays, for example selected depending on size constraints and need. The robotic carrier may operate wheels according to the pre-programmed model and the robotic carrier may monitor a position of the robotic carrier using lasers and the reflective tape to accurately place the robotic carrier within the computerized model (called a "field"), to make sure that the robotic carrier doesn't run into any walls, and to ensure that the robotic carrier makes it to the appropriate bay. The model may also indicate to the robotic carrier when the robotic carrier should turn to enter the designated bay. Once the robotic carrier enters the bay, a lift engages the pallet and lifts the pallet up to a height that's level with the bay's floor, which may be above the elevation of the alleyway floor. Once the pallet is lifted to the level of the bay floor, the pallet may be secured in place. A platform between the back of the vehicle and back doors may raise and lock in place.

The Pick-Up Bay

In various embodiments, after the pallet is secured in the pick-up bay, a signal may be sent to the bay doors that causes the rear doors that lead to the alleyway to close, and allows the front doors to open and customers to enter. The customer may inspect the vehicle, and if it is to his or her satisfaction, the customer or an employee may enter the car and drive it out of the bay onto the street.

Retrieving the Pallets

After the vehicle has been removed from the bay, the door may close. Once the door is closed, a command may be sent (e.g., by an interaction of an employee with a control system, automatic door-close signal, etc.) to the robotic carrier, and the robotic carrier may receive a signal indicating that there are no humans or other obstructions in the bay. First the back doors may open and the back platform may lower such that the robotic carrier enters the bay and places itself underneath the pallet. The pallet may be lowered onto the robotic carrier, secured by metal pins on the pallet that engage holes in the pallet. The robotic carrier may then carry the pallet back to the tower, where another vehicle is either loaded onto it, or it is placed in an empty storage slot in the tower.

The Customer Experience

In various embodiments, a customer may arrive at a reception area adjacent to the tower alleyway, with a glass window that allows a view into the alleyway. An employee may verify the customers purchase and may give the customer a coin that is encoded with an RFID device. The customer may then drop the coin into a slot (e.g., a slot of a customer interaction kiosk), which includes a device that detects RFID signals. When the coin passes through the slot device, the RFID device in the coin may be detected and the unique identification may be decoded. A computer system may then look up the unique identification in a database to confirm that it corresponds to a vehicle that was purchased and that is located in the tower. If the vehicle is in the tower, the computer then sends a signal with the position number where the car is located, instructing the tower to retrieve the vehicle in that position and move it to an open bay.

Alternate Track System

In various embodiments, the system may use a track or rail system rather than a robotic carrier. In such a track or rail embodiment, the carrier may be placed on tracks or rails and may move along the alleyway using the tracks or rails that are secured to the floor. Each bay also may have a pair of tracks or rails that extend perpendicular or nearly perpendicular to the alleyway tracks or rails. There is a junction where the bay tracks or rails and the alleyway tracks or rails meet, which may allow the carrier to either continue down the alleyway tracks or rails or turn to engage the bay tracks or rails, depending on how the junction is configured. Where the last bay and the alley way tracks or rails intersect there may not be a junction but a curved track or rail that diverts the track or rail to connect the end of the alleyway track or rail and the last bay's track or rail.

In various embodiments that use the track or rail system, the carrier may have a separate pallet called a bay pallet. The carrier may carry the bay pallet underneath the pallet on which the car sits, called the tower pallet. The bay pallet engages and secures the tower pallet. Then the carrier carries the bay pallet, tower pallet, and car, until it is aligned with an empty bay. Using a telescoping process, the bay pallet and tower pallet are moved into the bay. The carrier then retracts the telescopic device, leaving the bay pallet, the tower pallet, and the car, in the bay for customer pick-up, and freeing the carrier to go retrieve another bay pallet from another bay and/or to go retrieve another tower pallet and car from the tower. The carrier may also include a rotating system to rotate the bay pallet and tower pallet to orient it with a bay.

Automatic Video System

In various embodiments, cameras may be placed at important vantage points in the tower, including at the following locations: (1) on the ceiling of the tower looking downward to capture a birds-eye view of the tower; (2) from within each storage slot in the tower looking at the side of the vehicle; (3) at the base of the tower, adjacent to the passage from the tower atrium to the alleyway, and looking across that passage; (4) from the far end of the alleyway, looking down the alleyway toward the passage to the tower; (5) from the portion of the pick-up bay closest to the street, looking back toward the passage from the pick-up bay to the alleyway; and/or (6) from within the pick-up bay, looking toward the portion closest to the street where customers will be looking on.

In various embodiments, these cameras may be constantly recording video and may be synchronized to a same clock. When a vehicle retrieval command is issued to the tower, the computer system may record timestamps of key events in the vehicle's retrieval, including: (1) when the vehicle is stationary in the storage slot; (2) when the vehicle is picked up by the tower shuttle; (3) when the vehicle is descending down the tower shuttle; (4) when the vehicle is placed on the robotic carrier; (5) when the vehicle is carried down the alley way by the robotic carrier; (6) when the vehicle enters the pick-up bay; and/or (7) when the doors to the entrance of the pick-up bay open to allow the customer to enter.

In various embodiments, the computer system may automatically retrieve the videos recording from specific cameras of specific times during their recording based on the timestamps recording corresponding to the vehicle's retrieval. For example, the computer system retrieves video from the aerial view of the tower from when the vehicle pallet first enters the tower atrium until its descent is complete.

In various embodiments, the computer system may then join these video segments together into one video, and optionally add a template introduction or conclusion to the video. The video may be stored on a server, and a link may be sent to the customer which allows a customer to download the video or share it on one of multiple social media sites, such as Facebook or YouTube.

FIG. 1A illustrates an example of a vehicle vending machine 100 according to various embodiments. Vehicle vending machine 100 may include a tower 102, a corridor 104, and a plurality of delivery bays 106a-106d. The tower 102 may include an exterior door 108 and an opening 110 positioned between the tower 102 and the corridor 104. The tower 102 may also include a lift-able shuttle 112 located within the center of the tower 102. Vehicle vending machine 100 may also include a lobby 120 and offices 122. One or more processors may be connected to the various motors, sensors, displays, cameras, and other equipment described herein that may be used in the vehicle vending machine to control such equipment to perform the operations described herein. The tower 102 may provide for the storage and display of vehicles on the different levels of the tower 102, such as 4 vehicles per level. The tower 102 may include multiple levels, such as 5 to 8, or more than 8 levels. The tower 102 may be a metallic structure with foundation and roof, vehicle pallets, and a central pick up lift-able shuttle 112. The lift-able shuttle 112 combines the functionalities of lifting, turning and moving of the platforms. The lift-able shuttle 112 may be located in the center of the tower 102 structure among the 4 main stays and has lifting and rotating movements. The vertical movement of the lift-able shuttle 112 may be driven by motors (e.g., 4 motors) integrated into the main columns directly under the roof and counterweights of the lifting system.

In various embodiments, each delivery bay 106a-106d may include an interior door 132a-132d positioned between the delivery bay and the corridor 104 as well as an exterior door 134a-134d positioned between the delivery bay and an exterior of the vehicle vending machine 100. In some embodiments, each interior door 132a-132d may only be opened when the corresponding exterior door 134a-134d is closed and each exterior door 134a-134d may only be opened when the corresponding interior door 132a-132d is closed.

Various vehicles 144a-144e and various vehicle pallets 142a-142e are illustrated in FIG. 1A. In various embodiments, vehicles 144a-144e are positioned on vehicle pallets 142a-142e within the vehicle vending machine 100. For example, FIG. 1A illustrates robotic carrier 114 carrying vehicle 144c positioned on vehicle pallet 142c. In various embodiments, the vehicle pallets 142a-142e may be closed metallic structures. The surfaces of the pallets 142a-142e may have an anti-skid coating. The pallets may be fitted with any type vehicle. A slight elevation in the middle of the pallets 142a-142e may act as a wheel deflector for positioning the car better. Wheels may ensure the sliding of the pallet and eyelets may be the hooking points for a pallet carrier.

In one embodiment, robotic carrier 114 may navigate corridor 104 while carrying vehicle 144c positioned on vehicle pallet 142c. The robotic carrier 114 may operate as an automated delivery system (ADS) to deliver vehicles from the tower 102 to the bays 106a-d. In this embodiment, robotic carrier 114 may deliver vehicle 144c positioned on vehicle pallet 142c to delivery bay 106c for delivery to a customer. In some embodiments, the robotic carrier 114 may traverse the corridor 104 independently by driving down the corridor 104 and aligning itself using its wheels within the corridor 104. In other embodiments, an optional track 170 or rail system may be included in the corridor 104 to guide the robotic carrier 114 through the corridor 104. The robotic carrier 114 may use a conductor line system for the transmission of power and data. A contact line may be installed in the floor of the corridor 104 to indicate that bays 106a-d and that will supply the robotic carrier 114 with electric power. On the same line data for the robotic carrier 114 to transport the pallets to the necessary bays. May be provided. The position of the robotic carrier 114 may be continuously monitored by a laser sensor placed underneath the robotic carrier 114. This laser sensor may read head moves along a bar code tape and the processor may calculate the absolute position data in the direction of travel with millimeter accuracy. This accuracy is possible because the laser scans simultaneously 3 bar codes and has flexible read distances which makes possible to bridge mechanical deviations. The labeling system allows the robotic carrier 114 to continue operation after an interruption (e.g. voltage drop or emergency stop) without needing to use a reference point. The communication with the robotic carrier 114 may be via wireless or wired communication, such as via WLAN (e.g., Wi-Fi, etc.) to a WLAN access point on the robotic carrier 114.

As shown in FIG. 1A, vehicle 144a positioned on vehicle pallet 142a may be located in delivery bay 106a for delivery to a customer and vehicle 144d positioned on vehicle pallet 142d may be located in delivery bay 106d for delivery to another customer. In addition, vehicle 144e positioned on vehicle pallet 142e may be located in a storage slot of the tower 102. In various embodiments, robotic carrier 114 may be configured to retrieve an empty pallet, such as vehicle pallet 142b, from a delivery bay, such as delivery bay 106b, and return the empty pallet to the tower 102. In various embodiments, a customer may decline or otherwise decide not to take delivery of a vehicle, in which case the robotic carrier 114 may be configured to retrieve the vehicle positioned on a vehicle pallet from the delivery bay (e.g., vehicle 144d positioned on vehicle pallet 142d in delivery bay 106d).

Figure 1B:
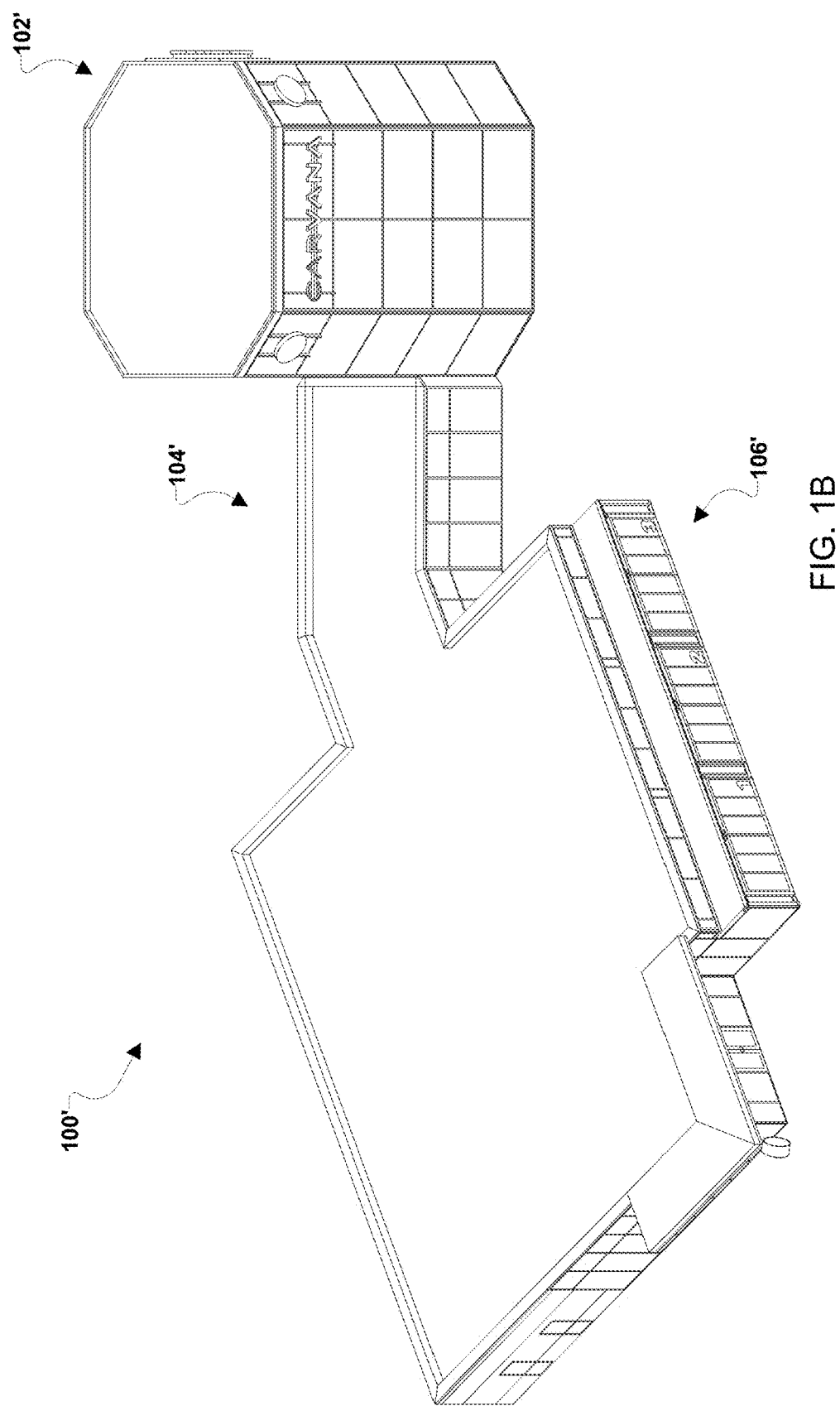
FIG. 1B illustrates an outside view of an example vehicle vending machine according to various embodiments.

FIG. 1B illustrates an outside view of an example vehicle vending machine 100' according to various embodiments. Vehicle vending machine 100' may be similar to vehicle vending machine 100 described above and below; and in a similar manner vehicle vending machine 100' may also include a tower 102', a corridor 104', and a plurality of delivery bays 106' as well as other devices and systems described herein.

Figure 1C:
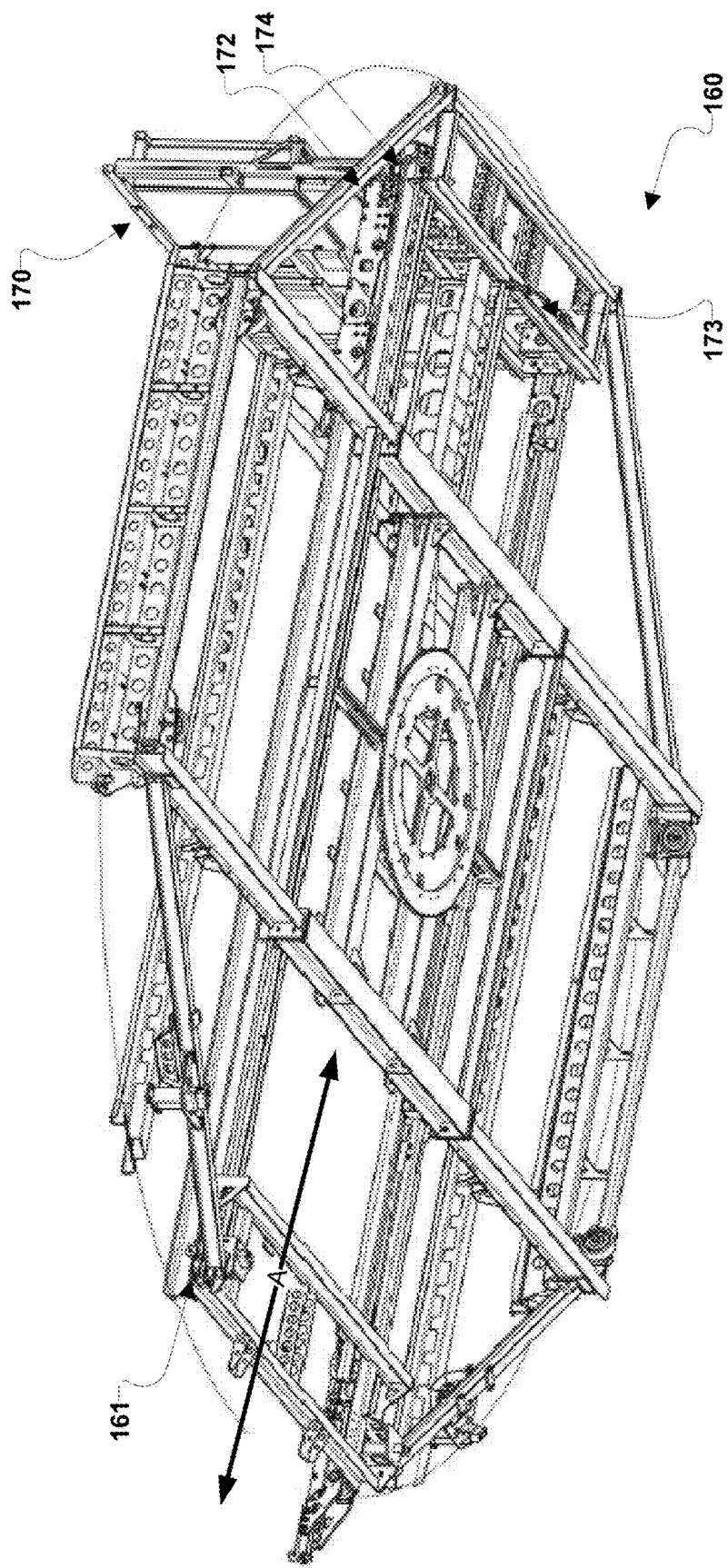
FIG. 1C is a block diagram of the underside of an example vehicle turntable according to various embodiments.
Figure 1D:
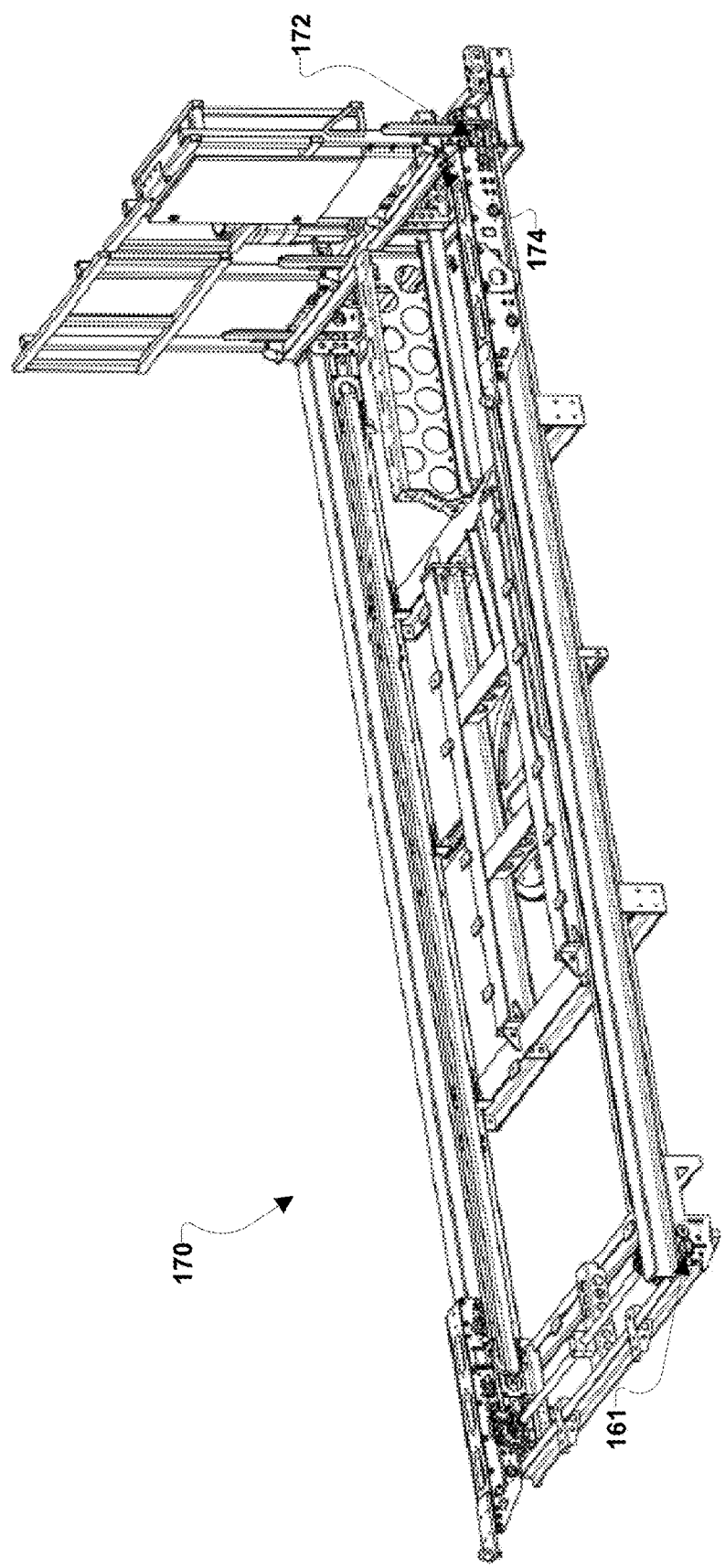
FIG. 1D is a block diagram of an example pallet carrier according to various embodiments.

In some embodiments, a vehicle, such as vehicle 144b, may be driven or otherwise delivered through the exterior door 108 for storage in the tower 102. This vehicle may be positioned on an empty vehicle pallet, such as vehicle pallet 142b, and lifted by lift-able shuttle 112 to an appropriate level within the tower 102. FIG. 1C illustrates the underside of an example vehicle turntable 170 according to various embodiments. The turntable 160 may be a portion of the lift-able shuttle 112 within the tower 102. As a vehicle, such as vehicle 144b is driven onto the lift-able shuttle 112, the turntable 160 may enable the vehicle and its vehicle pallet 142b to be rotated to align with the storage areas in the tower 102. The pallet carrier 170 may be a portion of the turntable 160 and may support the vehicle pallet 142b on the lift-able shuttle 112 and turntable 160. The turntable 160 may provide stability and guides the shuttle 112 up and down the mainstays while the pallet-carrier 170 that telescopes may pick up the car pallets from their parking position. FIG. 1D illustrates the pallet carrier 170 in more detail. The pallet carrier 170 and turntable 160 may rotate together around a central axis to align vehicles and their vehicle pallets 142b for storage in the tower 102, retrieval from the tower 102, and placement on the robotic carrier 114. The pallet carrier 170 may extend in direction "A" out from and into the turntable 160 to move vehicle pallets onto and off of the lift-able shuttle 112. As illustrated in FIGS. 1C and 1D, the pallet carrier 170 may include various sensors 161, 172, 173, and 174. The sensors 161, 172, 173, and 174 may be any type sensors, such as inductive sensors, limit switches, etc. The sensors 161, 172, 173, and 174 may enable the processor of the vehicle vending machine 100 to determine whether or not a vehicle pallet 142b is positioned on the lift-able shuttle 112 and whether or not the pallet carrier 170 is fully or partially retracted or extended in direction "A". The turntable 160 of the lift-able shuttle 112 moves by means of a transmission chain operated by a central geared motor. This motor also has a frequency converter or drive that manages the speed and brake points according to the programmed parameters. The turning movement is important because it places the car in the right position either to be stored when lifting, or to face the exit gate 108 or the corridor 104 when lowering.

The pallet carrier 170 picks up the vehicle pallet and places it on the lift-able shuttle 112. A further motor with frequency converter controls the speed of the sliding movement of the telescopic arms of the pallet carrier 170. The pallet carrier 170 has as a back-up system of two roller-lever operated limit switches, one at each end. These sensors may monitor an improbable wrong movement of the telescopic arms (e.g. over passing the delivery position). The telescopic arm picks up the pallet by engaging the two eyelets of the car-pallet with two cylindrical pins. An inductive proximity sensor may monitor that the pallet is engaged. The lift unit for the lift-able shuttle may include four motors and variable frequency drives, 4 chains, and 4 counterweights dimensioned to carry the lift-able shuttle 112 and its weight up and down the tower 102. The position and speed of the motors may be regulated by frequency inverters, each motor having a frequency inverter. The speed may be programmable; for instance, the lift-able shuttle 112 may be slowed down short before reaching the end position. The program may also monitor and compare the signals given by each frequency converter to ensure they are synchronized and the lift-able shuttle 112 is level.

In various embodiments, the operations of the vehicle vending machine 100 may be controlled by control panels, such as one or more control panels in the lobby 102 and/or offices 122. Additionally, the control panels may be portable. The control panels may be computing devices including processors configured to communicate with one or more processors of the vehicle vending machine controlling the various devices and systems within the vehicle vending machine. The control panels may be used to enable customers to select their vehicle and pick that vehicle up and by employees to perform various functions within the vehicle vending machine 100. For example, the control panels may enable customers and/or employees to initiate retrieval of a particular vehicle from the tower 102, initiate the opening or closing of the front gates to the bays 106a-d, and initiate the retrieval and/or delivery of pallets by the robotic carrier 114.

Figure 2A:
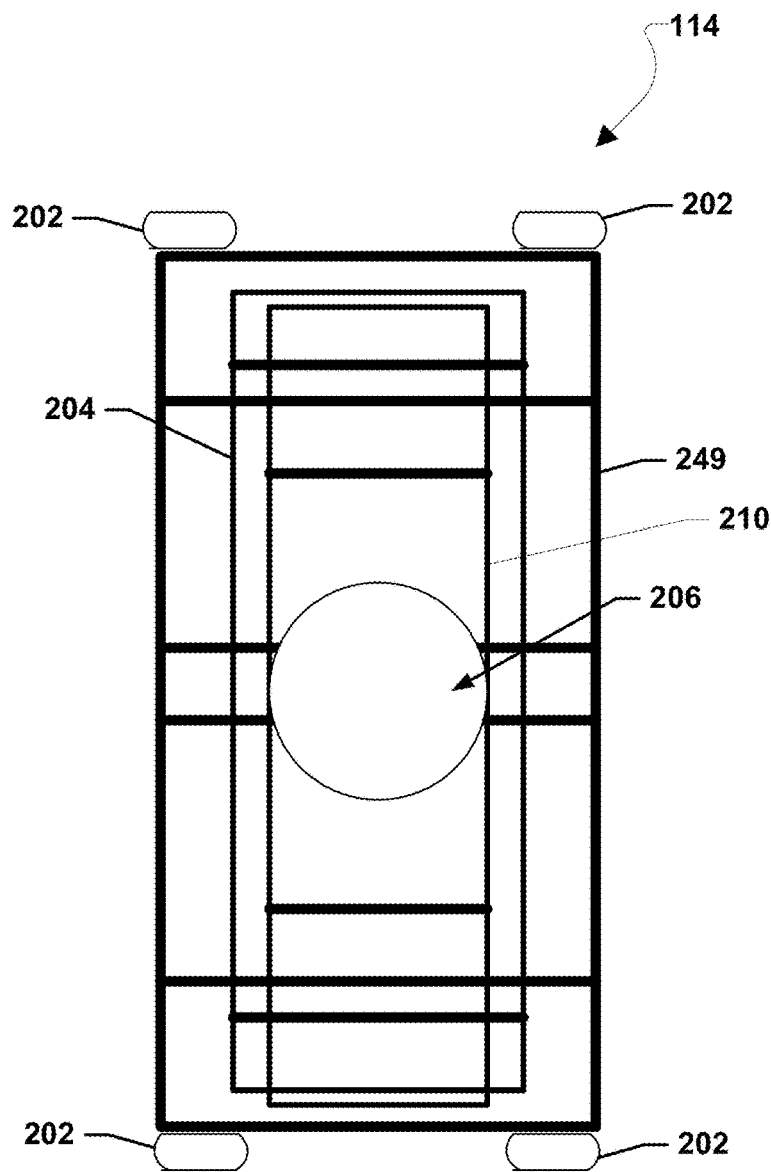
FIGS. 2A-2E are block diagrams of an example of a robotic carrier for use in a vehicle vending machine, according to various embodiments.
Figure 2B:
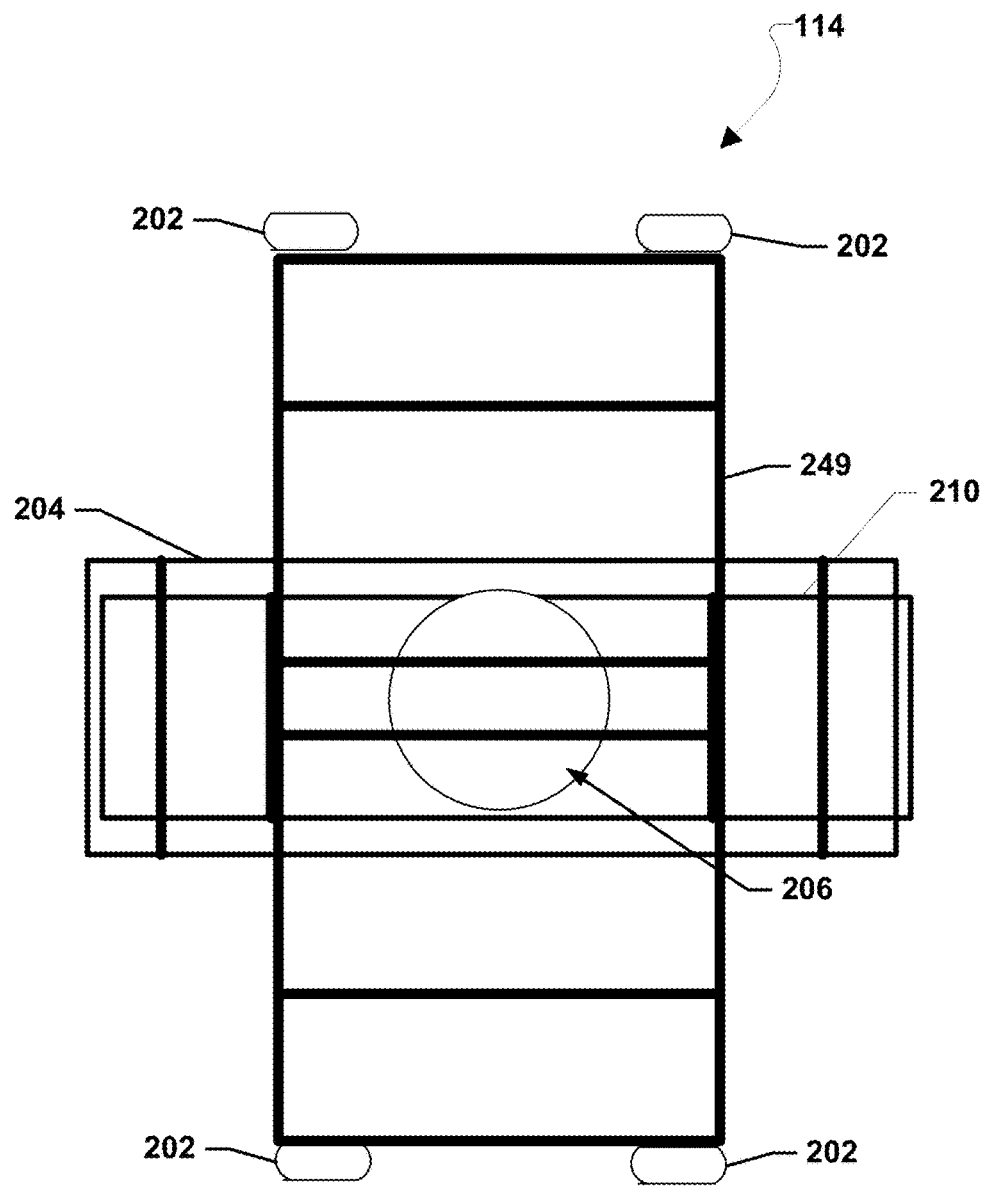
Figure 2C:
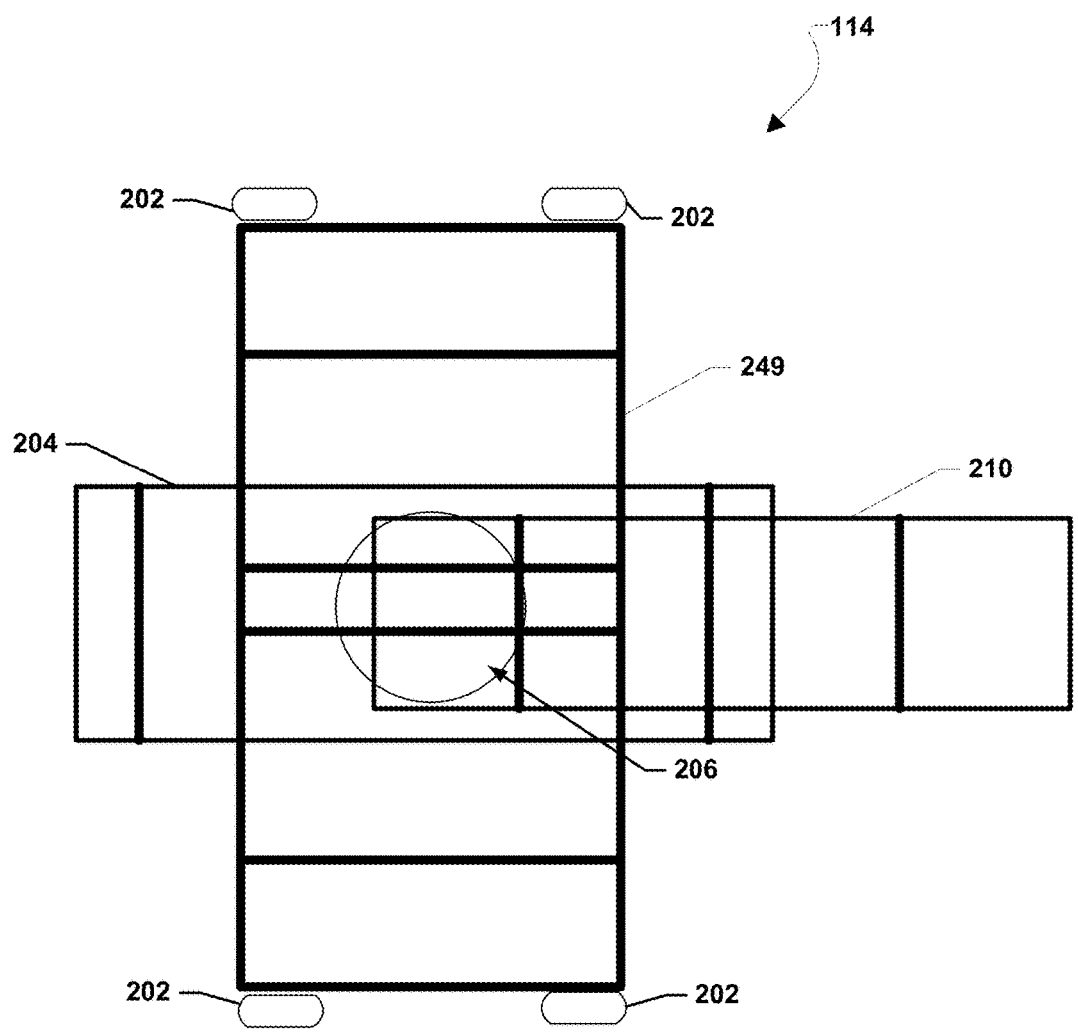
Figure 2D:
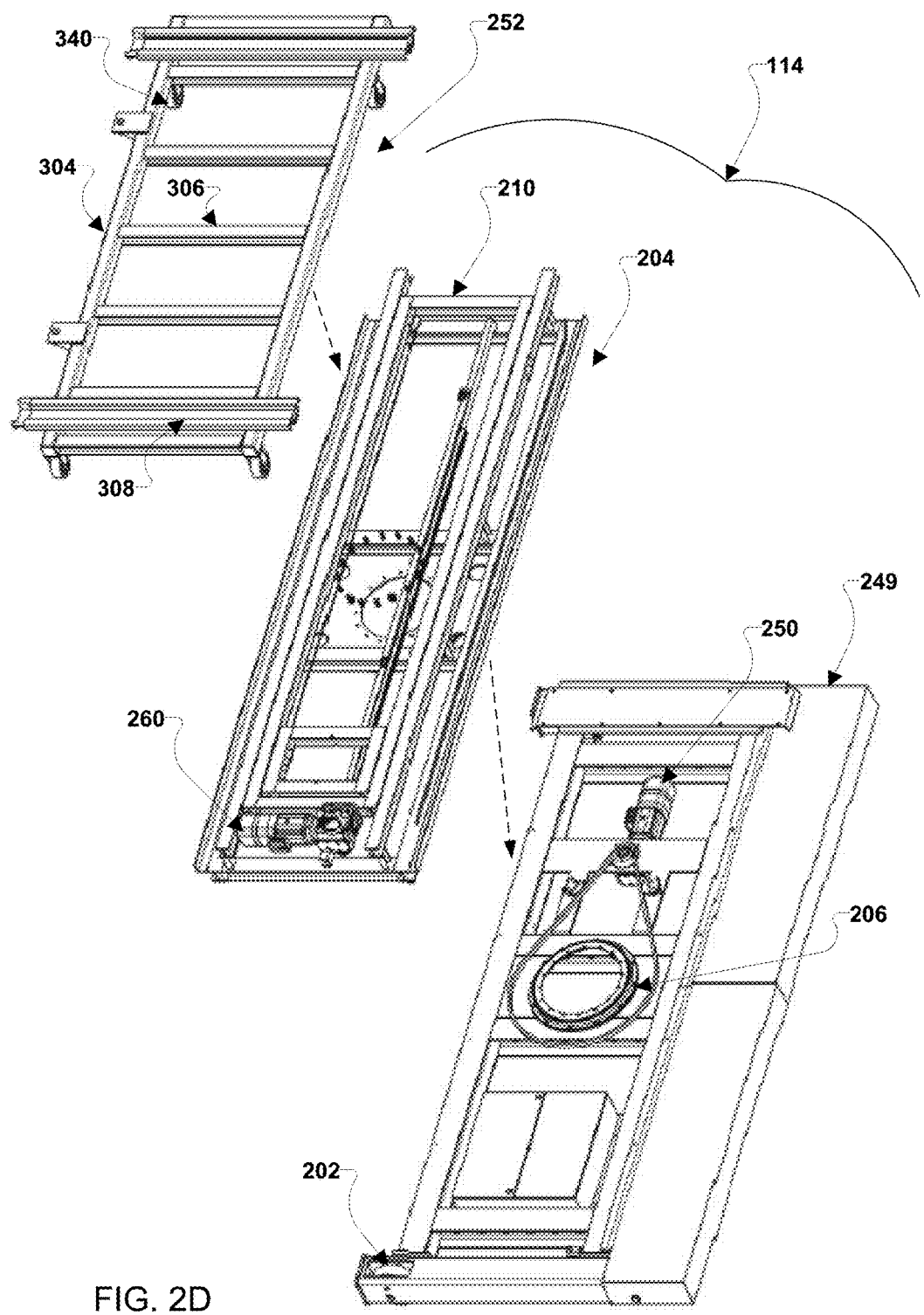
Figure 2E:
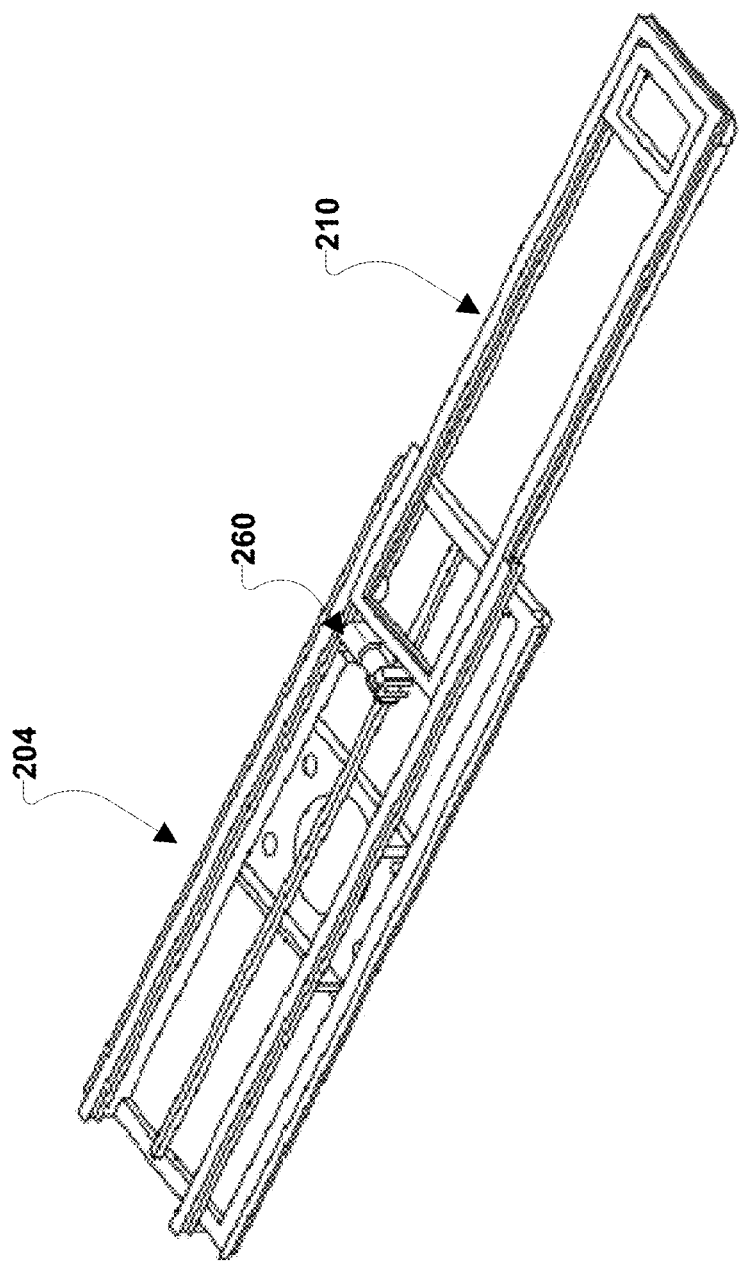

FIGS. 2A-2E illustrate various examples of a robotic carrier 114 for carrying a vehicle positioned on a vehicle pallet while navigating a corridor of a vehicle vending machine. The robotic carrier 114 may include a telescopic device 204 including a telescopic guide arm 210, and a gear or other rotation mechanism 206. In various embodiments, robotic carrier 114 may include wheels 202. In some embodiments, the wheels 202 may move along tracks 170 or rails by which the robotic carrier 114 may traverse an area of the vehicle vending machine. In other embodiments, the robotic carrier 114 may drive independent of tracks 170 or rails from one area to another. FIG. 2A illustrates the robotic carrier 114 fully collapsed or otherwise contained within a single space. FIG. 2B illustrates the robotic carrier 114 with the telescopic device 204 rotated at a 90° angle from the robotic carrier 114. FIG. 2C illustrates the robotic carrier 114 with the telescopic device 204 rotated at a 90° angle from the robotic carrier 114 and extended from the robotic carrier 114. FIG. 2D is an exploded diagram of the robotic carrier 114 and a pallet carrier 252 for carrying a vehicle pallet, such as vehicle pallets 142a-e described above. The pallet carrier 252 may be pulled onto the robotic carrier 114 by the telescopic guide arm 210 of the telescopic device 204 which may itself rest on top of the base 249 of the robotic carrier 114. The base 249 of the robotic carrier 114 may include the rotation mechanism 206 driven by a motor 250 that may rotate the telescopic device 204, telescopic guide arm 210, the pallet carrier 252, and any vehicle pallet thereon. A motor 260 on the telescopic device 204 may extend and retract the telescopic guide arm 210. Pallet carrier 252 may include an outer frame 304 and one or more cross-bars 306. Pallet carrier 252 may also include one or more pallet supports 308 and wheels 340. The pallet carrier 252 may include any number of wheels, such as two, four, or more wheels. FIG. 2E illustrates the telescopic device 204 with the telescopic guide arm 210 extended.

Figure 3:
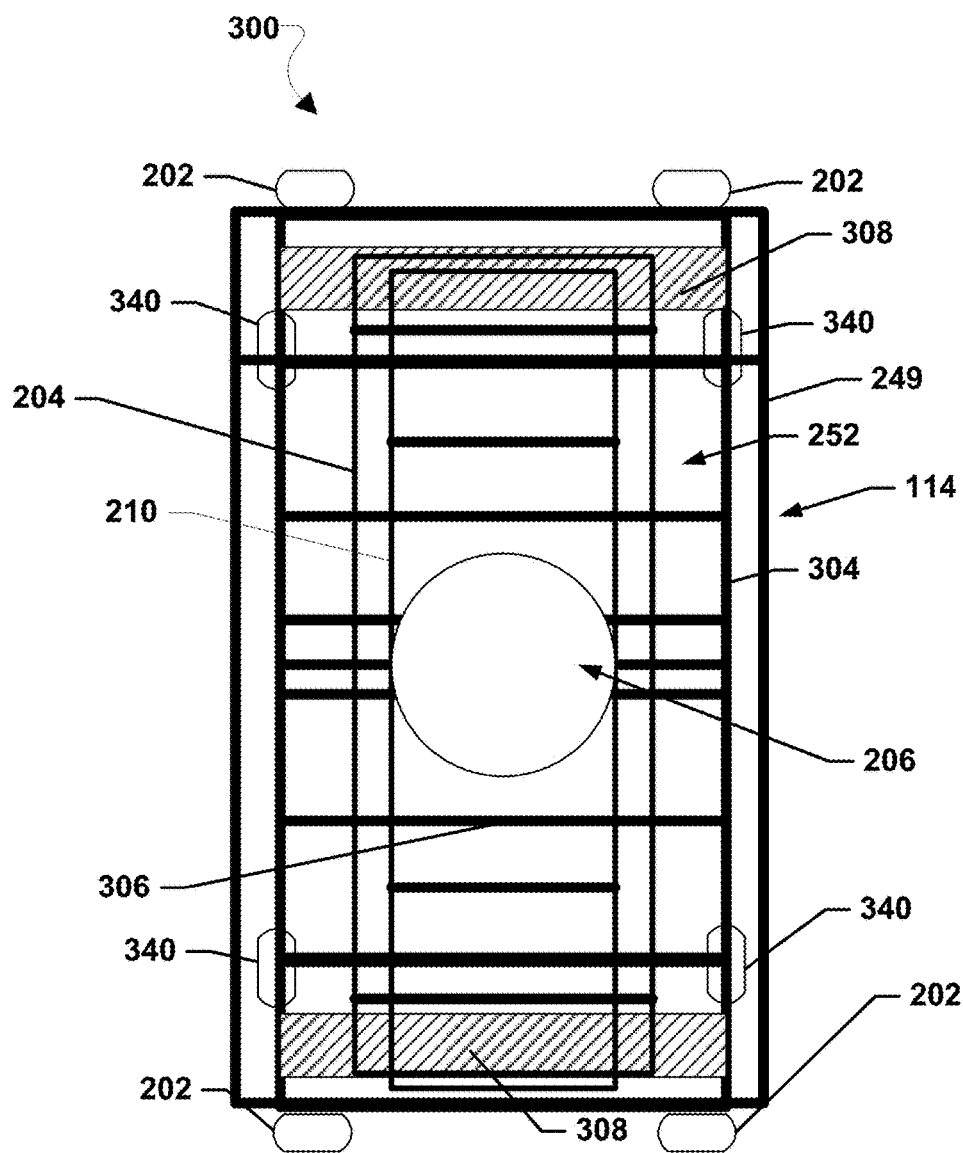
FIG. 3 is a block diagram of an example of a pallet carrier for use in a vehicle vending machine, according to various embodiments.

FIG. 3 illustrates an example of a system 300 for carrying a vehicle pallet on a robotic carrier, according to various embodiments. In some embodiments, the system 300 may include a pallet carrier 252 and robotic carrier 114 for carrying a vehicle pallet. In various embodiments, the pallet carrier 252 may be positioned on a robotic carrier, such as robotic carrier 114. In other embodiments, the pallet carrier 252 may be positioned or otherwise located in a location other than a robotic carrier. As such, pallet carrier 252 may be configured to be loaded onto and unloaded from the robotic carrier 114. In FIG. 3, the pallet carrier 252 is shown on the telescopic device 204.

Figure 4A:
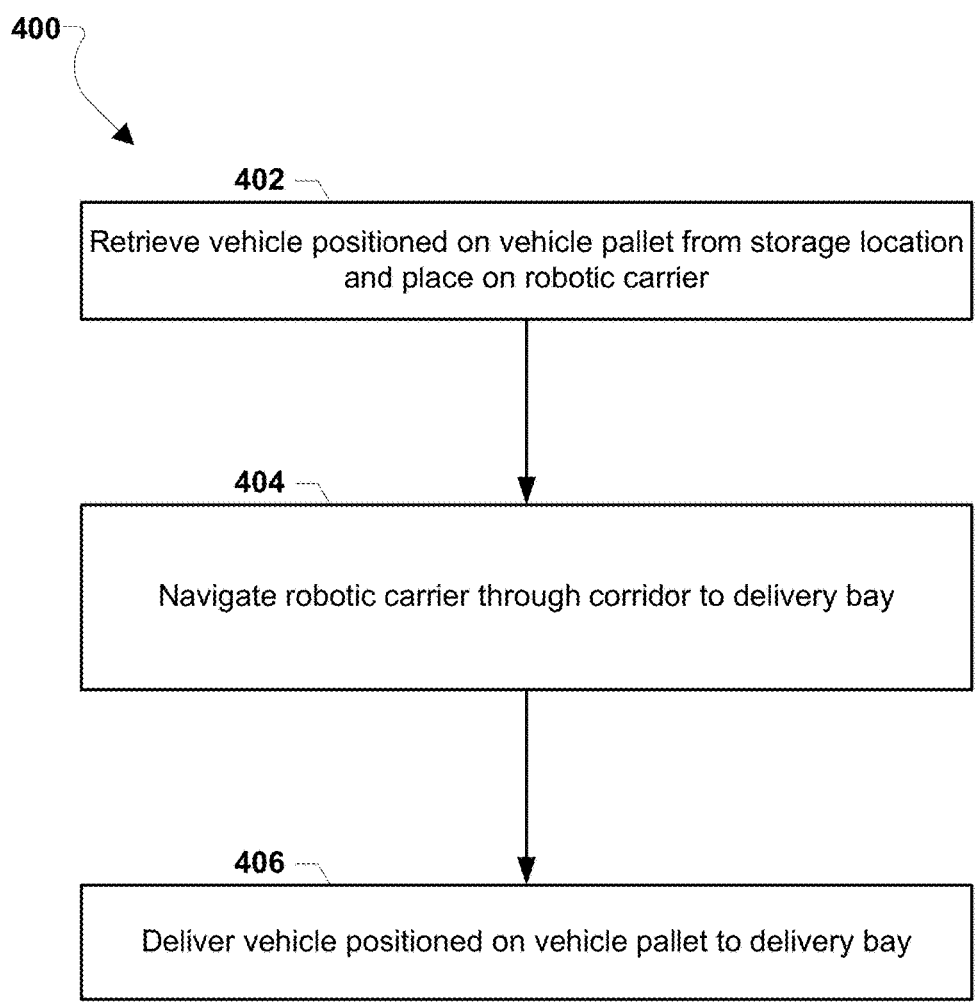
FIGS. 4A-4C are process flow diagrams illustrating examples of methods for operating a vehicle vending machine, according to various embodiments.

FIG. 4A illustrates a method 400 for operating a vehicle vending machine according to various embodiments. With reference to FIGS. 1A-4A, the operations of the method 400 may be performed by one or more processors of a vehicle vending machine (e.g., vehicle vending machine 100). The vehicle vending machine may have sensors, cameras, and communication resources that may be used for retrieving a vehicle, navigating a corridor, and delivering a vehicle to a delivery bay.

In block 402, a vehicle positioned on a vehicle pallet may be retrieved from a storage location within a tower of a vehicle vending machine and placed on a robotic carrier. For example, if the vehicle is stored in a storage location on the fourth floor of the tower, a lift-able shuttle may be lifted to the fourth floor, the vehicle positioned on the vehicle pallet may be placed onto the lift-able shuttle, and the lift-able shuttle may be lowered to the level of a corridor of the vehicle vending machine. Once lowered, the vehicle positioned on a vehicle pallet may be placed on a robotic carrier.

In block 404, the robotic carrier may navigate through a corridor to an appropriate delivery bay. In various embodiments, the robotic carrier may use a laser, a camera, and/or other sensors to monitor a position of the robotic carrier and traverse a path through the corridor. In some embodiments, the robotic carrier may include wheels that propel the robotic carrier along a floor of the corridor. In other embodiments, the corridor may include one or more tracks 170 or rails and the robotic carrier may be configured to follow the one or more tracks 170 or rails through the corridor.

In block 406, the vehicle positioned on the vehicle pallet is delivered to a delivery bay. For example, upon arrival at an appropriate delivery bay, the robotic carrier may place the vehicle positioned on the vehicle pallet within the delivery bay.

Figure 4B:
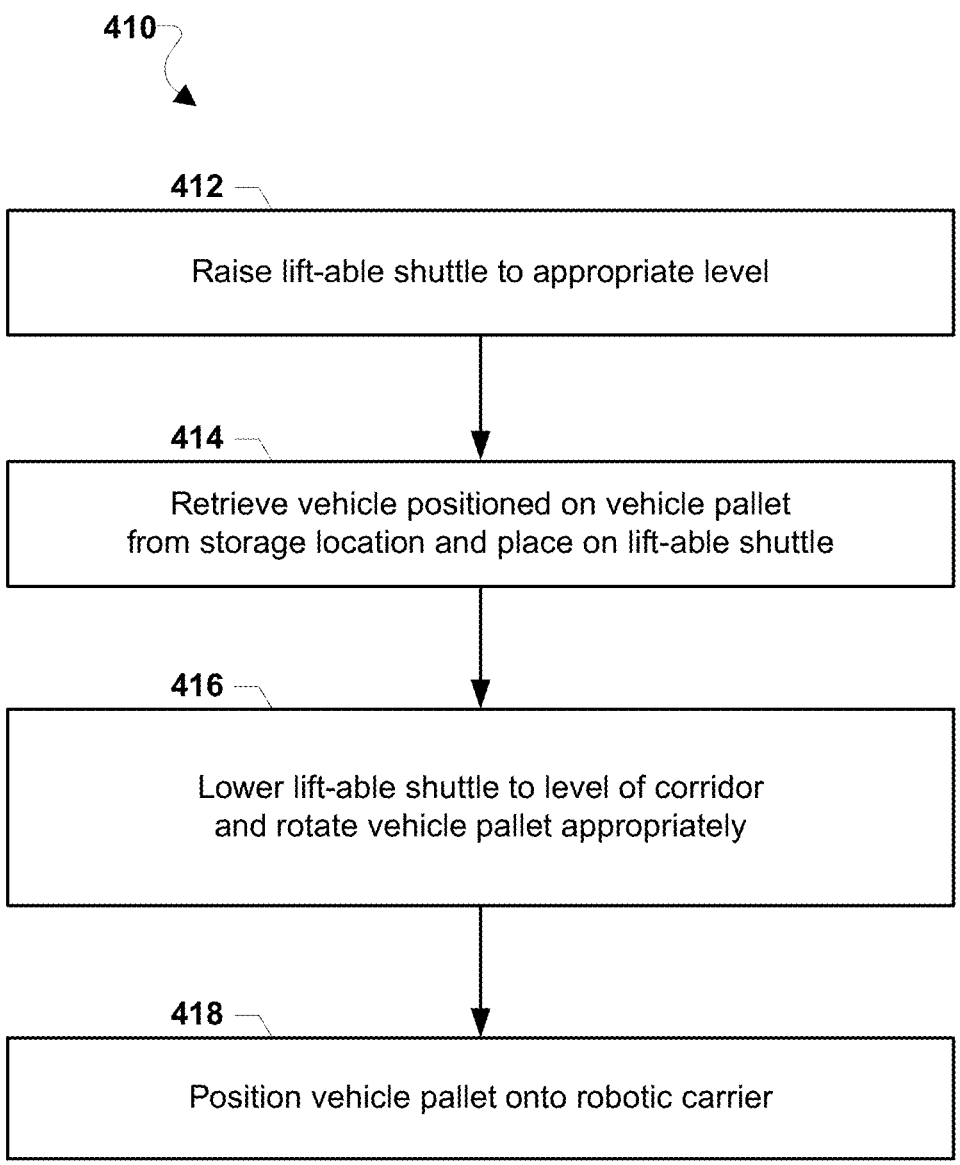

FIG. 4B illustrates a method 410 for retrieving a vehicle from a storage location within a tower of a vehicle vending machine. With reference to FIGS. 1A-4B, the method 410 provides examples of operations that may be performed in block 402 of the method 400. The operations of the method 410 may be performed by one or more processors of a vehicle vending machine (e.g., vehicle vending machine 100).

In block 412, a lift-able shuttle within the tower of the vehicle vending machine may be raised to an appropriate level of the tower. For example, if the vehicle is stored on the third level, the lift-able shuttle would be raised to the third level. In block 414, the vehicle positioned on a vehicle pallet is retrieved from the storage location and placed on the lift-able shuttle.

In block 416, the lift-able shuttle is lowered to the level of the corridor and the vehicle pallet is rotated appropriately. For example, the vehicle may have been stored in a storage location such that the vehicle is positioned perpendicular to the corridor while the vehicle needs to be positioned parallel to the corridor in order to be transported by a robotic carrier. In this example, the vehicle pallet (and the vehicle positioned on the vehicle pallet) would be rotated from the perpendicular position to the parallel position.

In block 418, the vehicle pallet is positioned onto the robotic carrier. For example, the vehicle pallet (and vehicle positioned on the vehicle pallet) may be moved or otherwise transferred from the lift-able shuttle to the robotic carrier via an opening in the tower.

Figure 4C:
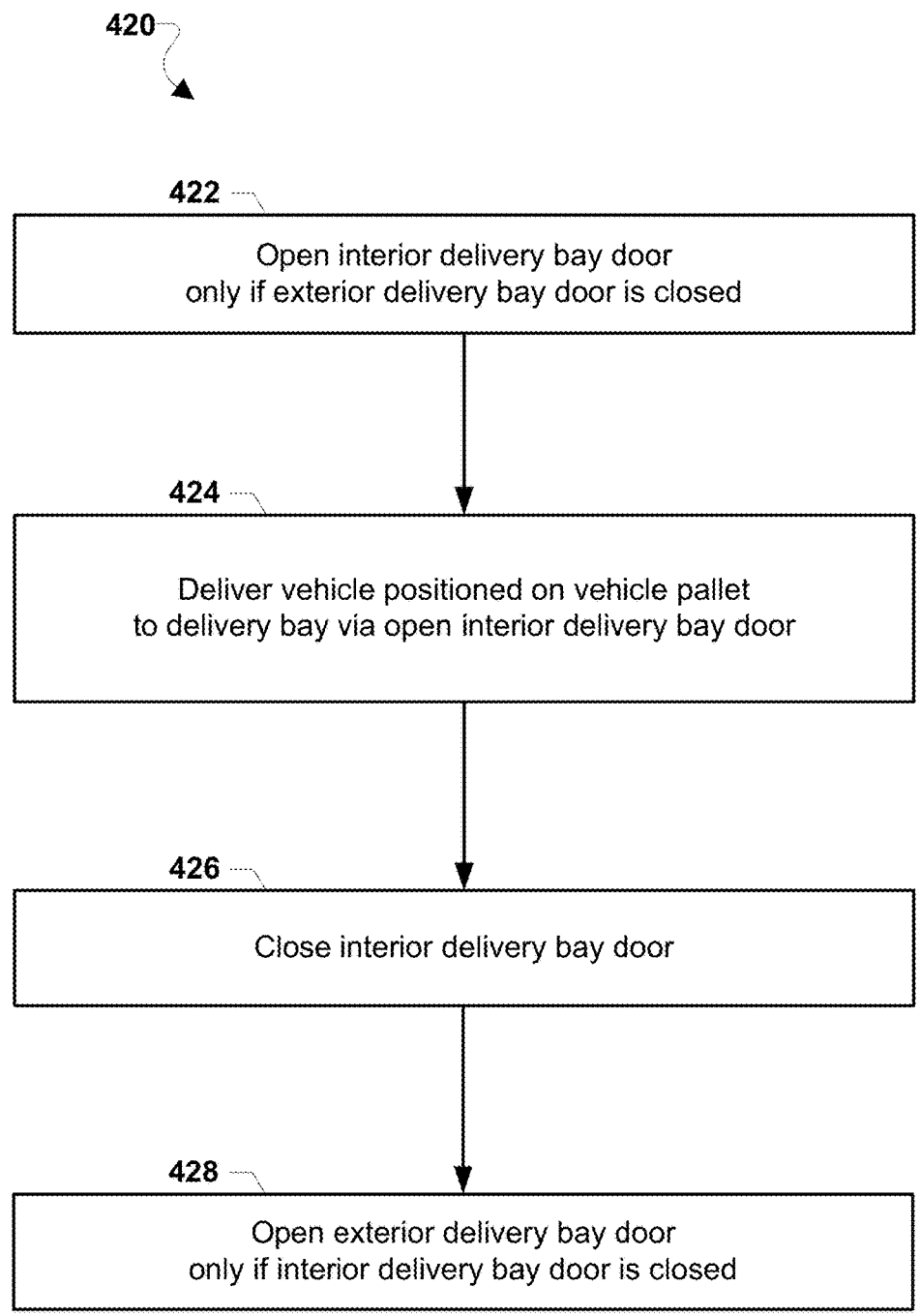

FIG. 4C illustrates a method 420 for delivering a vehicle to a delivery bay of a vehicle vending machine. With reference to FIGS. 1A-4C, the method 420 provides examples of operations that may be performed in block 406 of the method 400. The operations of the method 420 may be performed by one or more processors of a vehicle vending machine (e.g., vehicle vending machine 100).

In block 422, an interior delivery bay door may be opened only if an exterior delivery bay door is closed. In various embodiments, conditions within an empty delivery bay or within a corridor of the vehicle vending machine may be dangerous or otherwise unfit for a customer to enter. In some embodiments, delivery of a vehicle into a delivery bay may pose a risk to an individual standing or otherwise located in the delivery bay. As such, the interior delivery bay door may only be opened if the exterior delivery bay door is closed, thus ensuring no individual is present within the delivery bay.

In block 424, a vehicle positioned on a vehicle pallet may be delivered to the delivery bay via the open interior delivery bay door. For example, a telescopic device (e.g., 204) may be extended from a robotic carrier (e.g., 114), thus pushing or otherwise moving a pallet carrier (e.g., 302) into the delivery bay.

In block 426, the interior delivery bay door may be closed. In block 428, the exterior delivery bay door may be opened only if the interior delivery bay door is closed. The corridor and other areas within the vehicle vending machine may be inappropriate for a customer or other individual without specialized training. As such, the exterior door may be opened only if the interior door is closed to ensure the safety and well-being of a customer while precluding unwanted intrusion into the corridor or other inappropriate areas of the vehicle vending machine.

Figure 5:
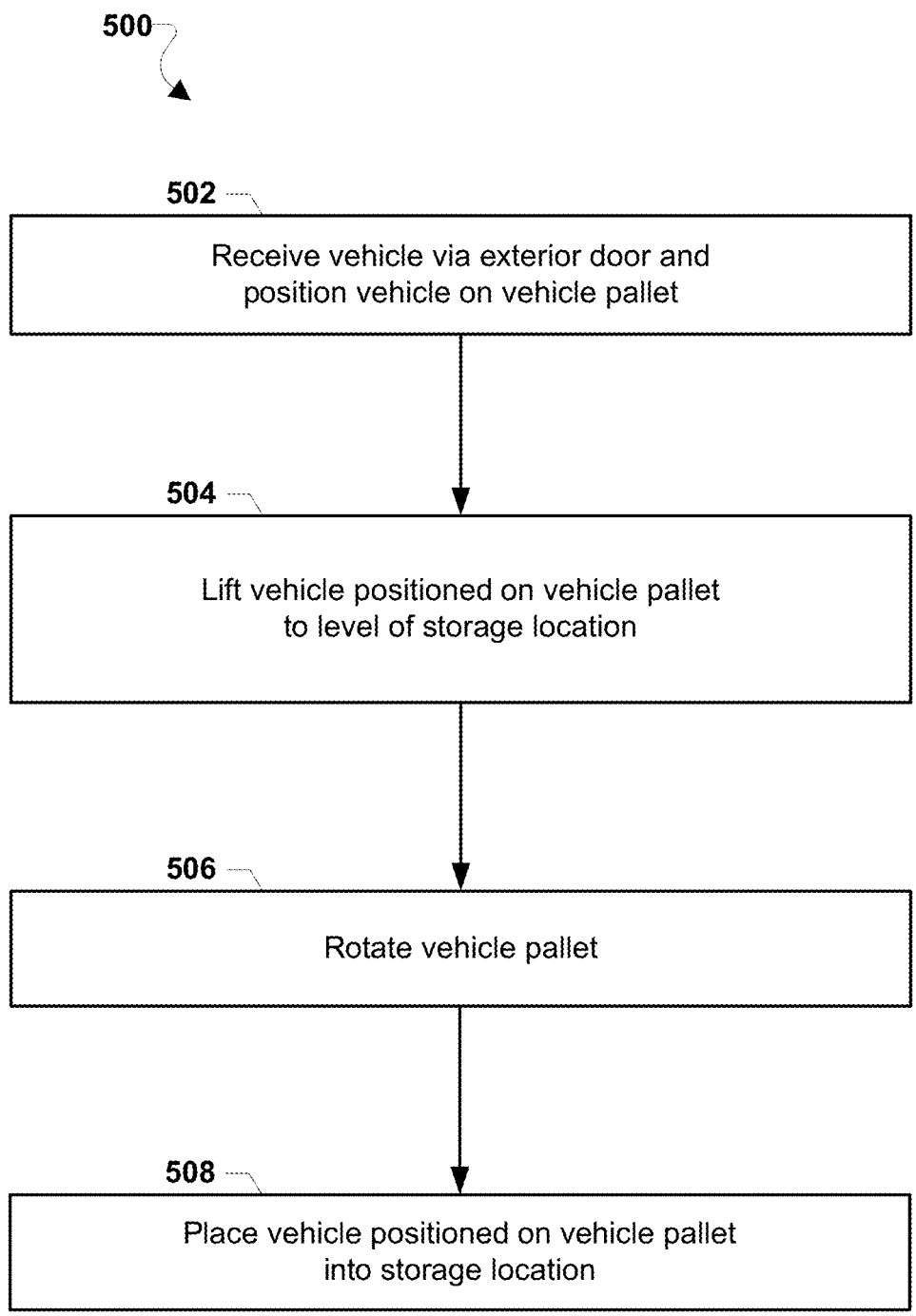
FIG. 5 is process flow diagram illustrating an example of a method for storing a vehicle in a vehicle vending machine, according to various embodiments.

FIG. 5 illustrates a method 500 for storing a vehicle in a tower of a vehicle vending machine. With reference to FIGS. 1A-5, the operations of the method 500 may be performed by one or more processors of a vehicle vending machine (e.g., vehicle vending machine 100). In block 502, a vehicle may be received via an exterior door of the tower and positioned on a vehicle pallet. For example, the vehicle pallet may be resting on a lift-able shuttle of the tower and the vehicle may be driven through the exterior door until the vehicle is positioned directly on the vehicle pallet. Alternatively, or in addition, the vehicle may be pushed or pulled through the exterior door until the vehicle is positioned on the vehicle pallet.

In block 504, the vehicle positioned on the vehicle pallet may be lifted to an appropriate level for a storage location. For example, the tower may include four (4) levels and the vehicle may need to be stored in a storage location on the third level. In some embodiments, a lift-able shuttle of the tower may be raised to the appropriate level (i.e., third level).

In block 506, the vehicle pallet is rotated to an appropriate orientation. For example, if the storage location is located along one wall of the tower and the exterior door is located along a wall opposite the storage location, the vehicle pallet (and vehicle positioned on the vehicle pallet) may be positioned perpendicular to the storage location. As such, the vehicle pallet may be rotated until the vehicle pallet (and vehicle positioned on the vehicle pallet) is oriented parallel to the storage location. In block 508, the vehicle positioned on the vehicle pallet is placed into the storage location.

Figure 6:
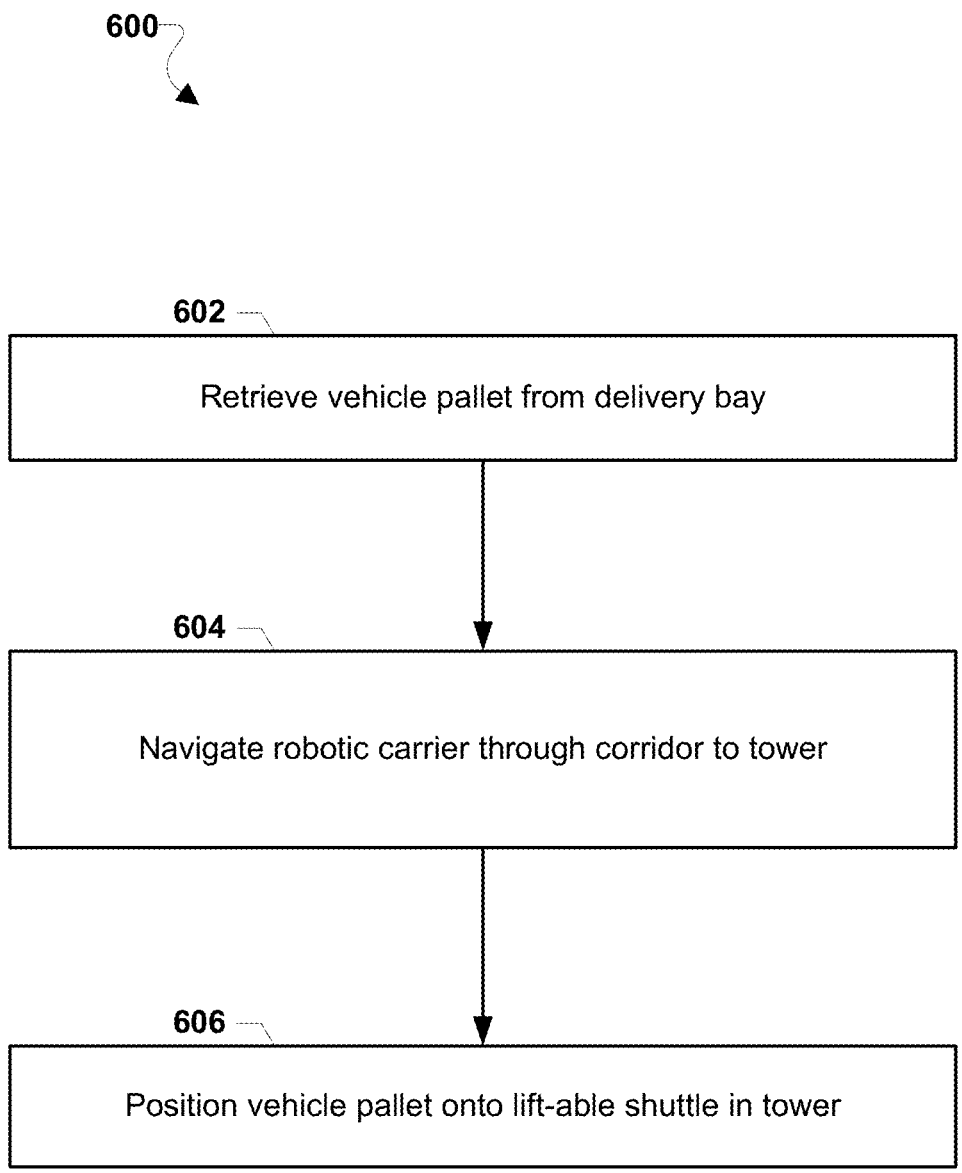
FIG. 6 is process flow diagram illustrating an example of a method for retrieving a vehicle pallet in a vehicle vending machine, according to various embodiments.

FIG. 6 illustrates a method 600 for retrieving a vehicle pallet from a delivery bay of a vehicle vending machine. With reference to FIGS. 1A-6, the operations of the method 600 may be performed by one or more processors of a vehicle vending machine (e.g., vehicle vending machine 100). In some embodiments, the vehicle pallet may be empty. In other embodiments, a vehicle may be positioned on the vehicle pallet. For example, after inspecting or otherwise reviewing the vehicle, a customer may decide to not take delivery of the vehicle, in which case the vehicle may need to be returned to storage.

In block 602, the vehicle pallet may be retrieved from the delivery bay. In some embodiments, an interior delivery bay door may only be opened if an exterior delivery bay door is closed. In some embodiments, a telescopic device (e.g., 204) may be extended from a robotic carrier (e.g., 114) and hook or otherwise engage a pallet carrier (e.g., 302) in order to retrieve the vehicle pallet.

In block 604, a robotic carrier may navigate through a corridor of the vehicle vending machine. For example, after retrieving the vehicle pallet from the delivery bay, the robotic carrier may carry the vehicle pallet back through the corridor to a tower of the vehicle vending machine.

In block 606, the vehicle pallet is positioned onto a lift-able shuttle of the tower. For example, the vehicle pallet may be pushed or otherwise delivered through an opening between the tower and the corridor. Once returned to the tower, the vehicle pallet (either empty or with a vehicle positioned on the vehicle pallet) may be placed into a storage location or, if empty, a vehicle may be positioned onto the empty vehicle pallet.

Figure 7A:
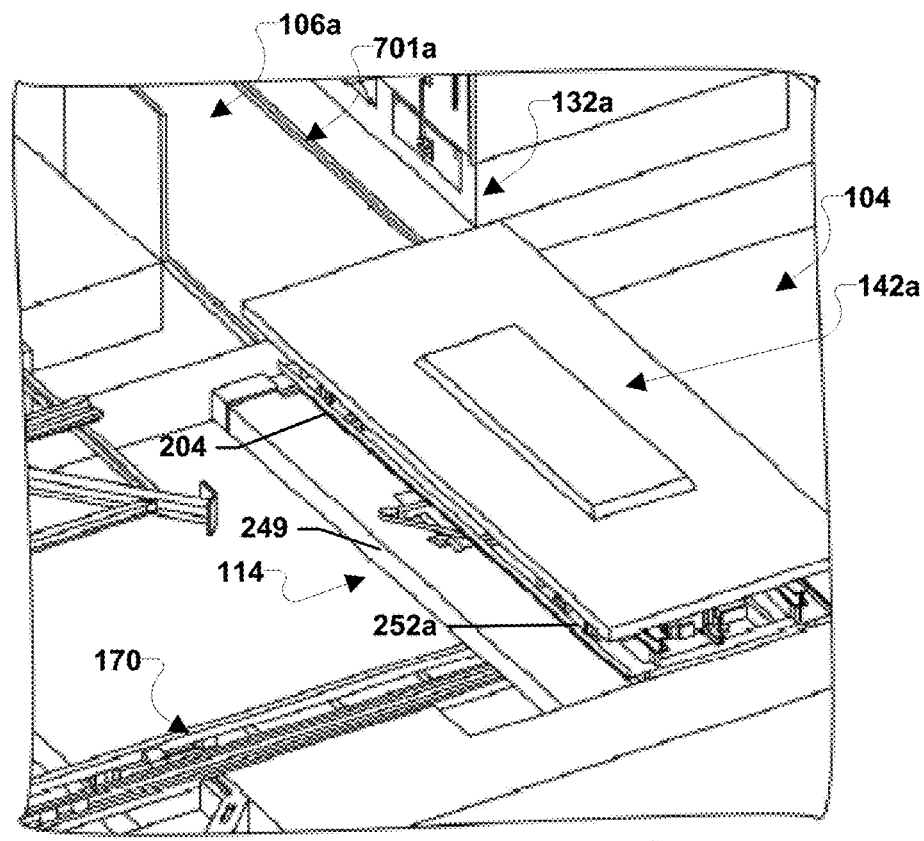
FIGS. 7A-7E illustrate movements of a vehicle pallet in a vehicle vending machine according to various embodiments.

FIGS. 7A-7E illustrate movements of a vehicle pallet in a vehicle vending machine according to various embodiments. With reference to FIGS. 1A-7E, the robotic carrier 114 for carrying a vehicle may carry the vehicle pallet 142a down the corridor 104 to outside delivery bay 106a and interior door opening 132a as shown in FIG. 7A. The vehicle pallets 142a may be supported by a pallet carrier 252a on the base 249 of the robotic carrier 114. The robotic carrier 114 may traverse the corridor 104 on track (or rail) 170. Tracks (or rails) 701a within the delivery bay 106a may be configured to receive the pallet carrier 252a supporting the vehicle pallet 142a. No vehicle is illustrated on the vehicle pallet 142a in FIGS. 7A-7E for ease of illustration; however, a vehicle for delivery to the bay 106a could be supported by the vehicle pallet 142a. The back portion of the bay 106a floor may split into two portions 702a and 703a that may lift up to allow the pallet carrier 252a supporting the vehicle pallet 142a to enter the bay 106a. When folded down, floor portions 702a and 703a may be at a height equal to the height of the vehicle pallet 142a, and the pallet 142a and floor portions 702a and 703b may form an elevated deck above the actual floor of the bay 106a. Additionally, the floor of the corridor 104a may be recessed below the actual floor of the bay.

Figure 7B:
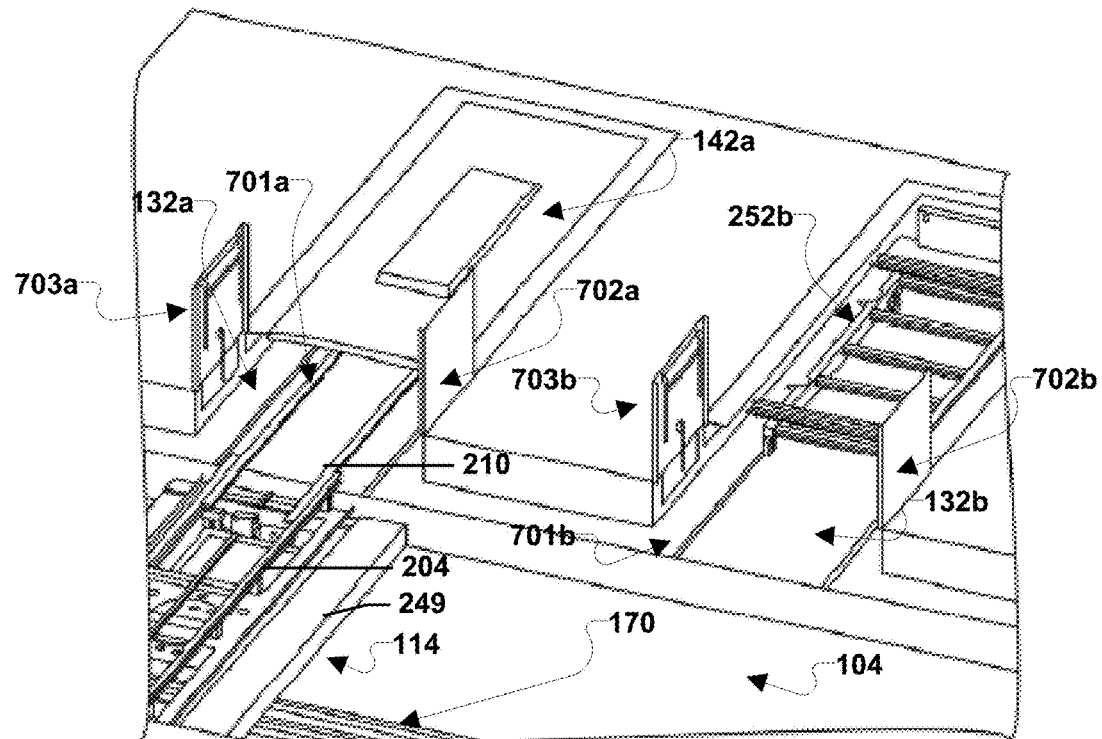

Referring to FIG. 7B, the telescopic guide arm 210 may extend from the telescopic device 204 to insert the pallet carrier 252a and vehicle pallet 142a into the bay 106a. The pallet carrier 252a may slide along the tracks (or rails 701a) in the bay 106a. FIG. 7B also illustrates a second pallet carrier 252b in bay 106b ready for pick-up by the robotic carrier 114.

In various embodiments, the delivery bays 106a and 106b are placed one next to the other alongside the corridor 104. The delivery bays include access doors, as well as floor compensation mechanisms. The floor in the delivery bays is prepared with a pit in the right size for the reception of the pallet carriers 252 bringing the vehicle on a pallet 146. The delivery bays may have 2 gates, the back- and the front-doors or gates. These doors are integrated in the automation of the vehicle vending machine and include a back and front gate. The front gate is the access for the customer from the street, and the back gate is a safety barrier closing the access of people to the area where the moving parts of the vehicle vending machine operate. Gates may include safety features such as manual opening, emergency stop, contact strips, etc. The back-gate enables the access of the pallet carriers 252 from the corridor 104 into the bays 106a-d. After placing the vehicle in the bay 106a, the telescopic guide arm 210 retracts and the back-gate to the corridor 104 will close automatically. The position of the pallet 142a may be calculated by the motor-inverter of the robotic carrier 114. After the pallet 142a is correctly placed, the floor compensation mechanism formed from the two floor portions 702a and 703a will be activated. This closes the pit behind the car pallet 142*a* to enable a flat a level surface all around the car for the customer to transit the area. For example, the floor mechanism may be 2-leaf hatch formed from floor portions 702*a* and 703*a*, each leaf controlled by electric motors. An inductive sensor per electrical motor may signal that the hatch is closed allowing the front door to unlock. The same sensor signal position open allowing the back door to open and the robotic carrier 114 to bring in the car pallet 142*a*. The vehicle vending machine may only unlock the front-gate when the car is safely parked in the delivery bay, the robotic carrier 114 has left the bay, and the back-gate is closed. The actual opening of the front-gate may be executed by an employee via a control panel when the customer is in place. When the employee leaves the bay, he or she may close the gate via the control panel. After a visual inspection of the inside of the bay, if there are neither obstacles nor people in the bay, the employee may give clearance to the vehicle vending machine via the control panel and the empty pallet will be picked up at the next possibility.

Figure 7C:
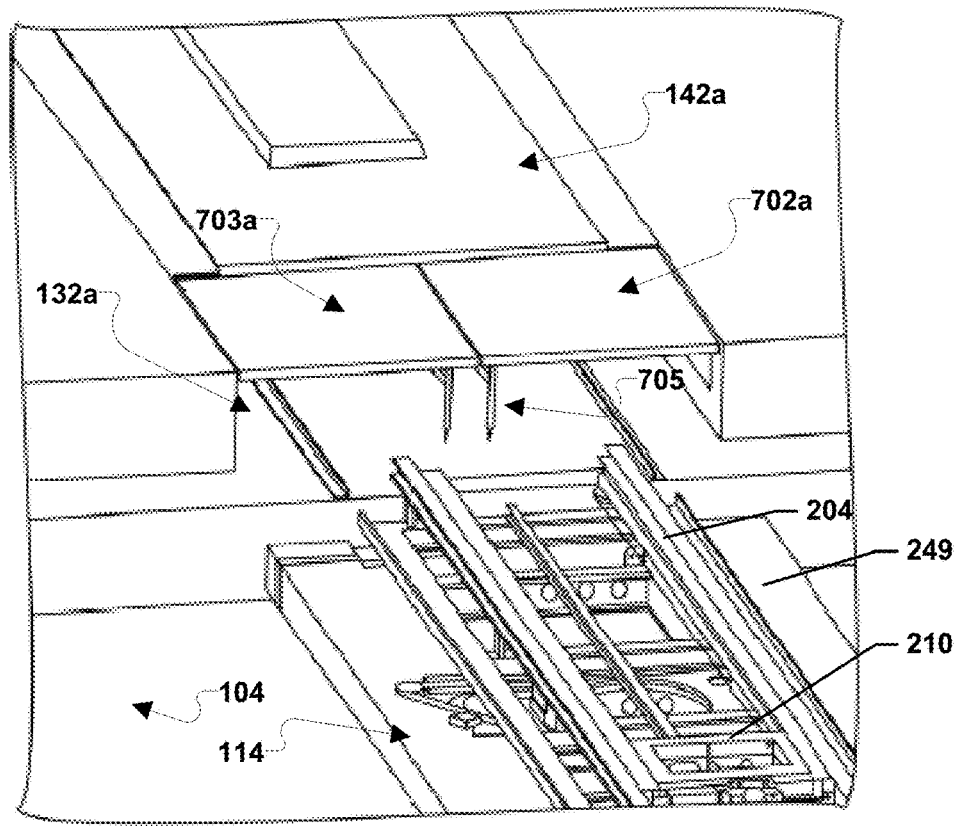
Figure 7D:
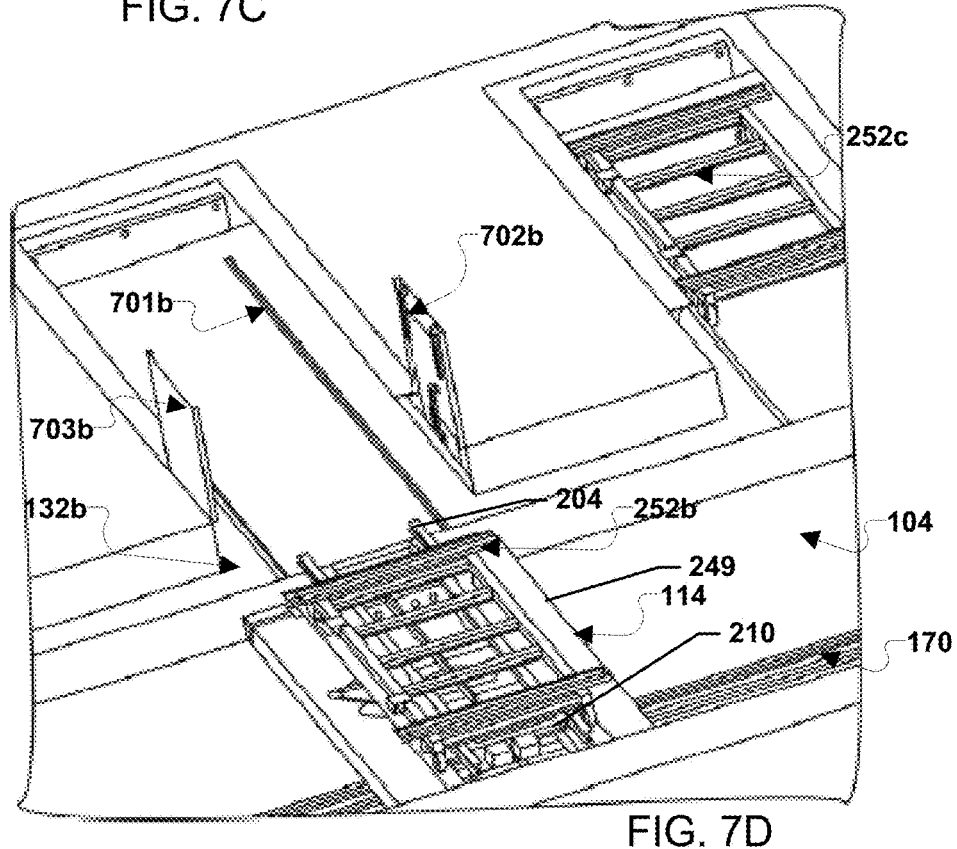
Figure 7E:
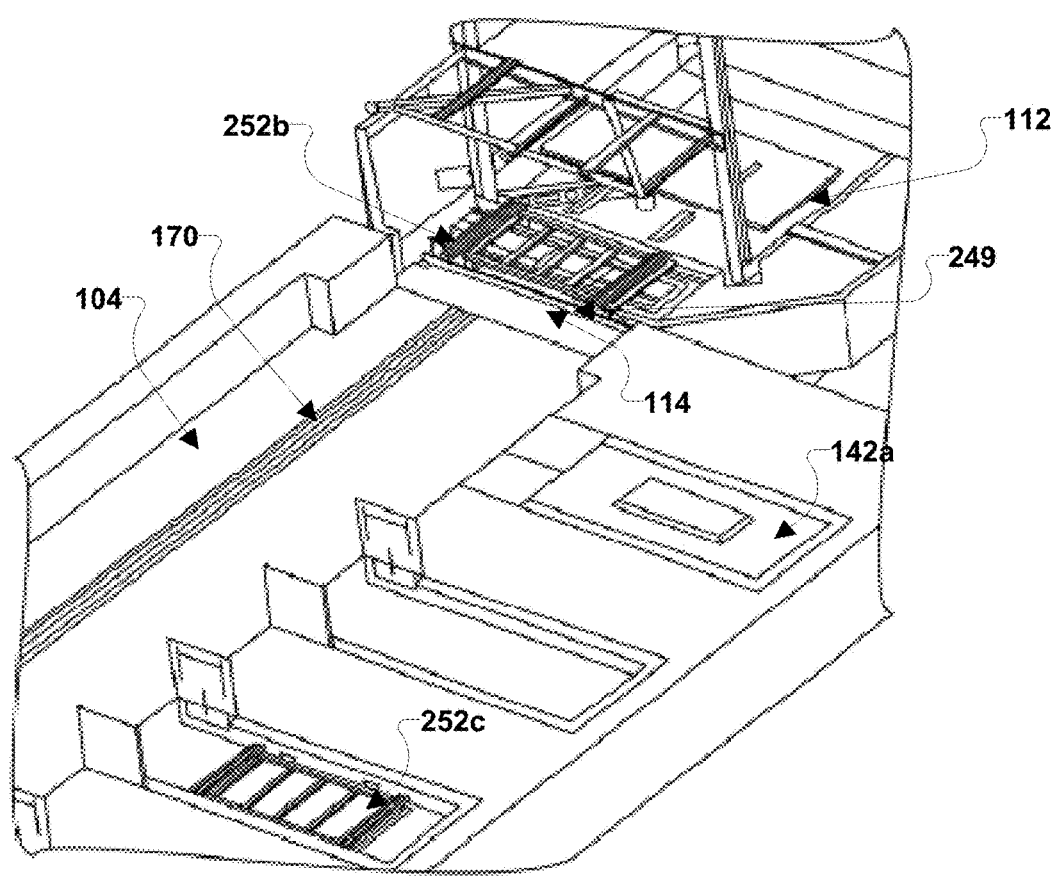

FIG. 7C illustrates the floor portions 702*a* and 703*a* in a closed position and supported above the bay 106*a* floor by legs 705. The telescopic guide arm 210 is retracted back into the robotic carrier 114. FIG. 7D shows the robotic carrier 114 retrieving the pallet carrier 252*b* from the bay 106*b*. Floor portions 702*b* and 703*b* of bay 106*b* are elevated and open and the pallet carrier 252*b* is retracted with the telescopic guide arm 210 back on the robotic carrier 114. A third pallet carrier 252*c* in another bay is also visible in FIG. 7D. FIG. 7E shows the robotic carrier 114 after traversing the corridor 104 back to the tower 102 to await delivery of another vehicle pallet and vehicle onto the pallet carrier 252*b*. The robotic carrier 114 moved from bay 106*b* to the tower 102 and is positioned next to the lift-able shuttle 112 to receive a vehicle pallet and vehicle.

Figure 8:
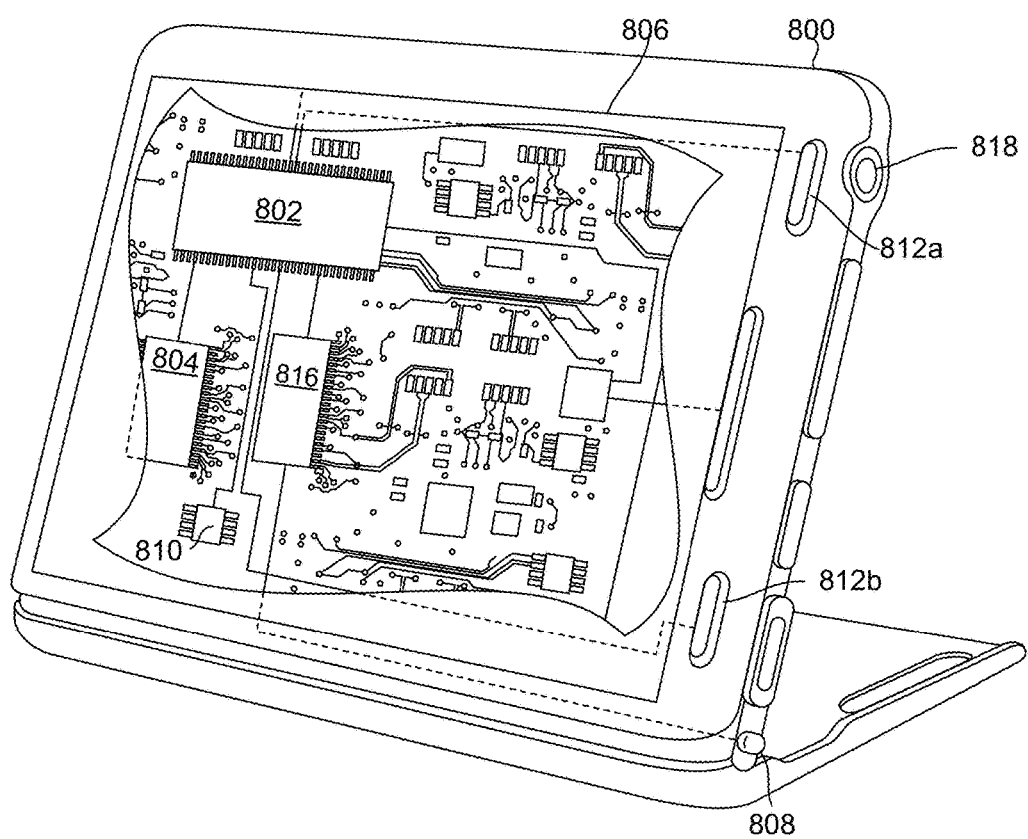
FIG. 8 is a component diagram of an example computing device suitable for use with the various embodiments.

The various embodiments may be implemented in any of a variety of computing devices, an example of which is illustrated in FIG. 8. For example, a computing device may be a mobile device 800 which may include a processor 802 coupled to internal memories 804 and 810. Internal memories 804 and 810 may be volatile or non-volatile memories, and may also be secure and/or encrypted memories, or unsecure and/or unencrypted memories, or any combination thereof. The processor 802 may also be coupled to a touch screen display 806, such as a resistive-sensing touch screen, capacitive-sensing touch screen infrared sensing touch screen, or the like. Additionally, the display of the mobile device 800 need not have touch screen capability. Additionally, the mobile device 800 may have one or more antenna 808 for sending and receiving electromagnetic radiation that may be connected to network interface, such as a wireless data link and/or cellular telephone transceiver 816, coupled to the processor 802. The mobile device 800 may also include physical buttons 812*a* and 812*b* for receiving user inputs. The mobile device 800 may also include a power button 818 for turning the mobile device 800 on and off.

Figure 9:
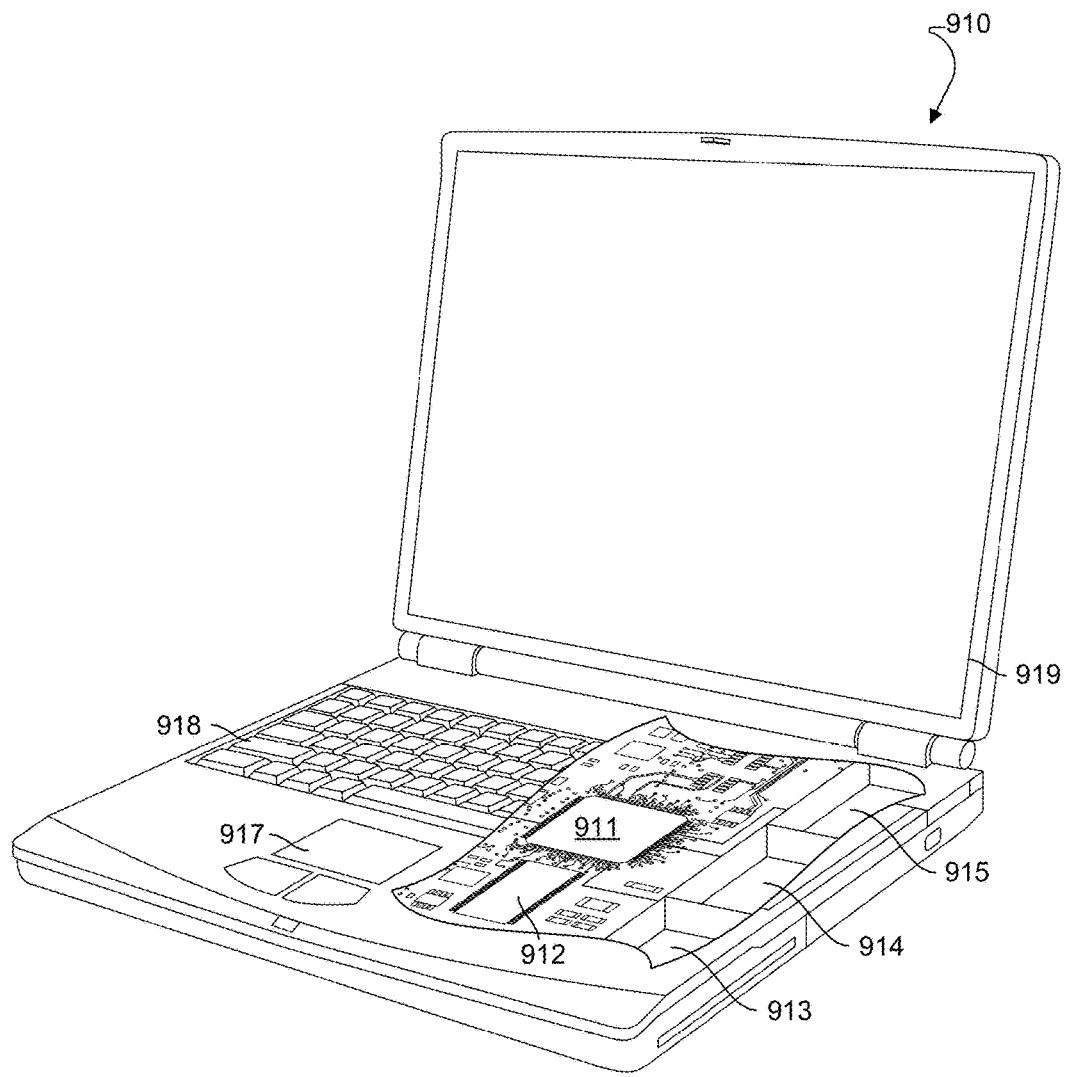
FIG. 9 is a component diagram of another example computing device suitable for use with the various embodiments.

The various embodiments described above may also be implemented within a variety of computing devices, such as a laptop computer 910 as illustrated in FIG. 9. Many laptop computers include a touchpad touch surface 917 that serves as the computer's pointing device, and thus may receive drag, scroll, and flick gestures similar to those implemented on mobile computing devices equipped with a touch screen display and described above. A laptop computer 910 will typically include a processor 911 coupled to volatile memory 912 and a large capacity nonvolatile memory, such as a disk drive 913 of Flash memory. The laptop computer 910 may also include a floppy disc drive 914 and a compact disc (CD) drive 915 coupled to the processor 911. The laptop computer 910 may also include a number of connector ports coupled to the processor 911 for establishing data connections or receiving external memory devices, such as a USB or FireWire® connector sockets, or other network connection circuits (e.g., interfaces) for coupling the processor 911 to a network. In a notebook configuration, the computer housing may include the touchpad 917, the keyboard 918, and the display 919 all coupled to the processor 911. Other configurations of the computing device may include a computer mouse or trackball coupled to the processor (e.g., via a USB input) as are well known, which may also be use in conjunction with the various embodiments.

Figure 10:
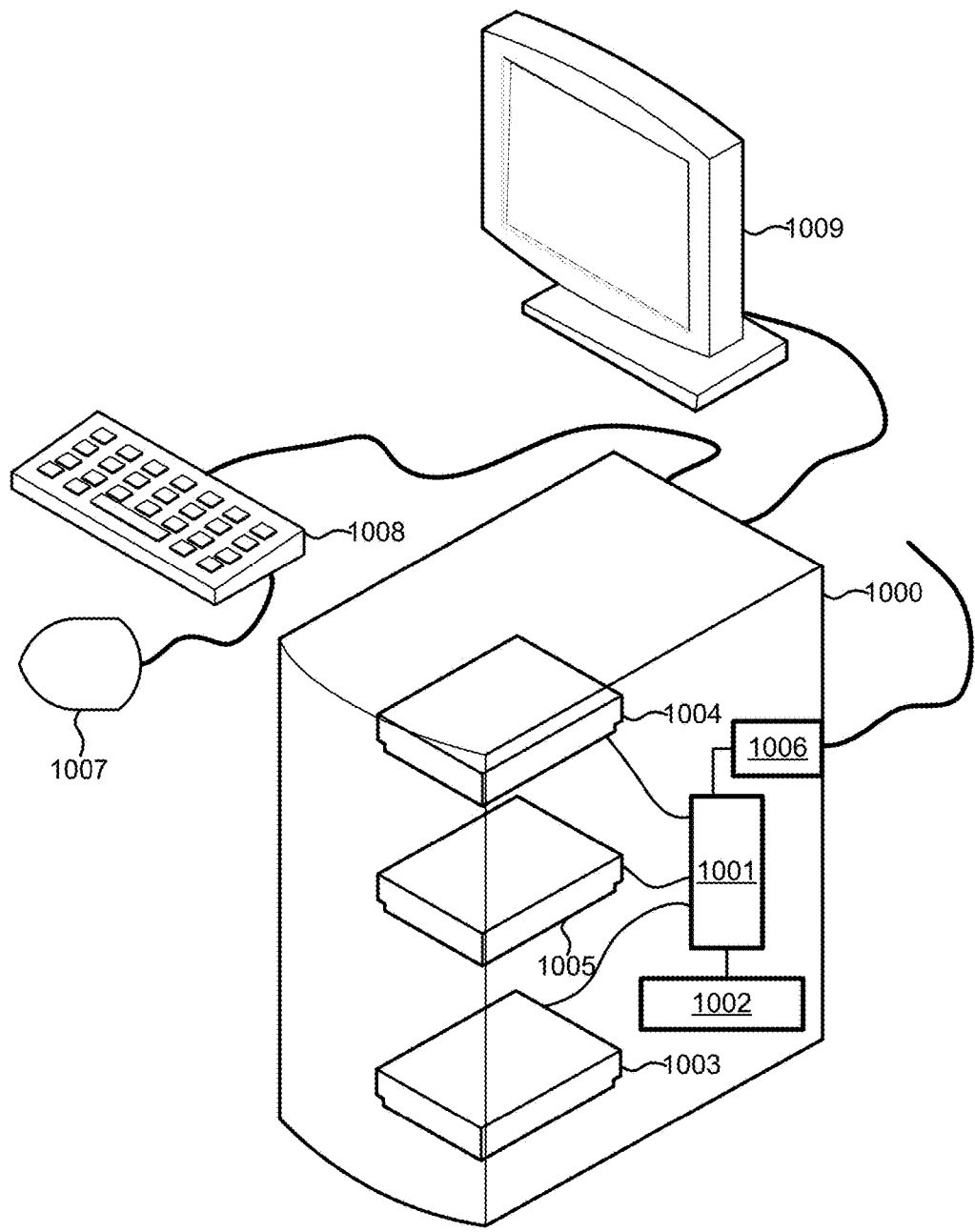
FIG. 10 is a component diagram of an additional example computing device suitable for use with the various embodiments.

The various embodiments described above may also be implemented within a variety of computing devices, such as a terminal computer 1000 as illustrated in FIG. 10. A terminal computer 1000 will typically include a processor 1001 coupled to volatile memory 1002 and a large capacity nonvolatile memory, such as a disk drive 1004 of Flash memory. The terminal 1000 may also include a floppy disc drive 1005 and a compact disc (CD) drive 1003 coupled to the processor 1001. The terminal 1000 may also include a number of connector ports 1006 coupled to the processor 1001 for establishing data connections or receiving external memory devices, such as a USB or FireWire® connector sockets, or other network connection circuits (e.g., interfaces) for coupling the processor 1011 to a network. Additionally, a keyboard 1008, mouse 1007, and display 1019 may all be coupled to the processor 1001.

Figure 11:
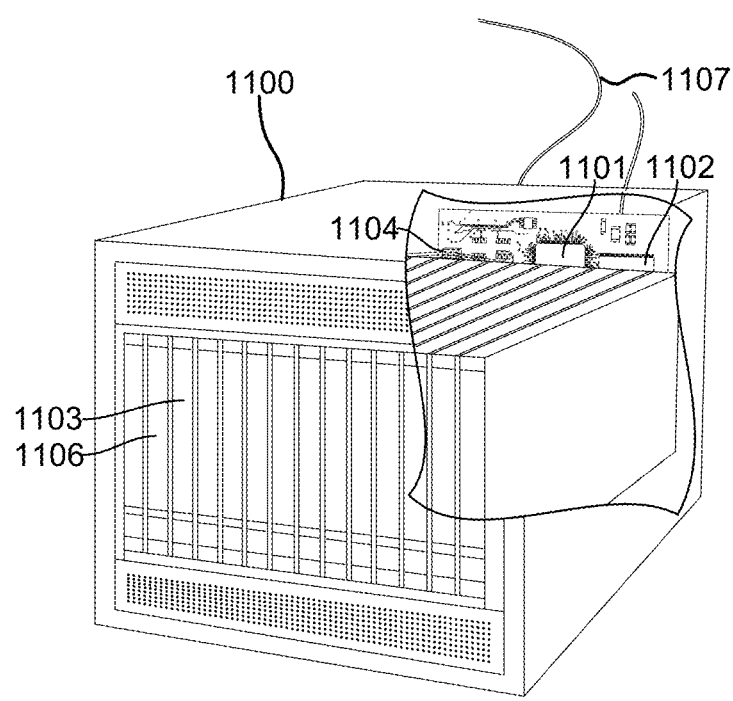
FIG. 11 is a component diagram of an example server suitable for use with the various embodiments.

The various embodiments may also be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1106 coupled to the processor 1101. The server 1100 may also include network access ports 1104 (network interfaces) coupled to the processor 1101 for establishing network interface connections with a network 1107, such as a local area network coupled to other computers and servers, the Internet, the public switched telephone network, and/or a cellular data network (e.g., CDMA, TDMA, GSM, PCS, 3G, 4G, LTE, or any other type of cellular data network).

The processors 802, 911, 1001, and 1101 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 802, 911, 1001, and 1101. The processors 802, 911, 1001, and 1101 may include internal memory sufficient to store the application software instructions. In many devices the internal memory may be a volatile or nonvolatile memory, such as flash memory, or a mixture of both. For the purposes of this description, a general reference to memory refers to memory accessible by the processors 802, 911, 1001, and 1101 including internal memory or removable memory plugged into the device and memory within the processor 802, 911, 1001, and 1101 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable medium, non-transitory processor-readable medium, or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A vehicle vending machine, comprising:
   a tower;
   a robotic carrier;
   a corridor extending from the tower;
   a plurality of delivery bays positioned along the corridor; and
   a customer interaction kiosk, wherein:
   a customer inserts a coin including an RFID tag into the customer interaction kiosk;
   an RFID reader within the customer interaction kiosk reads the RFID tag;
   a unique identification code from the RFID tag is compared to unique identification codes in a database to confirm that the unique identification code corresponds to a vehicle that was purchased and that is located in a storage location within the tower; and
   in response to a match between unique identification codes and the vehicle being located in a storage location within the tower:
      a signal with a position number corresponding to the storage location of the purchased vehicle within the tower is sent to the tower;
      the vehicle is retrieved from the storage location corresponding to the position number; and
      the vehicle is placed within one of the plurality of delivery bays for delivery to the customer.

2. The vehicle vending machine of claim 1, wherein the tower comprises:
   an exterior door through which vehicles enter the tower for storage; and
   an opening via which a vehicle retrieved from a storage location is placed onto the robotic carrier within the corridor.

3. The vehicle vending machine of claim 1, wherein the tower comprises 2, 3, 4, 5, 6, or more levels.

4. The vehicle vending machine of claim 1, wherein the tower comprises a lift-able shuttle configured to move a vehicle pallet to and from a storage location within the tower.

5. The vehicle vending machine of claim 4, wherein the lift-able shuttle is further configured to, in response to a command and after a vehicle is positioned on a vehicle pallet:
   lift the vehicle positioned on the vehicle pallet to an appropriate level;

rotate the vehicle pallet to an appropriate orientation; and
place the vehicle positioned on the vehicle pallet in a storage location.

6. The vehicle vending machine of claim 4, wherein the lift-able shuttle is further configured to, in response to a command:
retrieve a vehicle positioned on a vehicle pallet from a storage location within the tower;
rotate the vehicle pallet to an appropriate orientation; and
position, via the opening, the vehicle positioned on the vehicle pallet onto the robotic carrier within the corridor.

7. A vehicle vending machine, comprising:
a tower;
a robotic carrier;
a corridor extending from the tower;
a plurality of delivery bays positioned along the corridor; and
a video system comprising a plurality of cameras located within the tower, the corridor, and the plurality of delivery bays, each of the plurality of cameras configured to constantly record video synchronized to the same clock, the video system is configured such that:
in response to a vehicle retrieval command issued to the tower, the video system records timestamps of key events during retrieval of the vehicle;
the video system automatically retrieves a plurality of recorded video segments from one or more of the plurality of cameras, each retrieved recorded video segment corresponding to one of the recorded timestamps;
the video system joins the plurality of recorded video segments into one video;
the video system stores the one video on a server; and
the video system communicates a link to the customer which allows the customer to download the one video or share the one video on a social media site.

8. A control system for a vehicle vending machine, comprising:
a terminal; and
a processor coupled to the terminal and configured with processor-executable instructions to perform operations comprising:
retrieving a vehicle positioned on a vehicle pallet from a storage location within a tower of the vehicle vending machine;
navigating a robotic carrier through a corridor of the vehicle vending machine and to an appropriate one of a plurality of delivery bays of the vehicle vending machine while the robotic carrier carries the vehicle positioned on the vehicle pallet;
opening an interior delivery bay door positioned between the appropriate delivery bay and the corridor only if an exterior delivery bay door positioned between the appropriate delivery bay and an exterior of the vehicle vending machine is closed; and
delivering the vehicle positioned on the vehicle pallet to the appropriate delivery bay through the opened interior delivery bay door.

9. The control system of claim 8, wherein the processor is configured with processor-executable instructions to perform operations further comprising:
receiving, via an exterior door of the tower, a vehicle for storage in a storage location within the tower, the vehicle being positioned on a vehicle pallet;
lifting the vehicle positioned on the vehicle pallet to an appropriate level of the tower with a lift-able shuttle of the tower;
rotating the vehicle pallet to an appropriate orientation; and
placing the vehicle positioned on the vehicle pallet in a storage location.

10. The control system of claim 8, wherein the processor is configured with processor-executable instructions to perform operations such that retrieving a vehicle positioned on a vehicle pallet from a storage location within a tower of the vehicle vending machine comprises:
retrieving the vehicle positioned on the vehicle pallet from the storage location with a lift-able shuttle;
rotating the vehicle pallet to an appropriate orientation; and
positioning, via an opening of the tower, the vehicle positioned on the vehicle pallet onto the robotic carrier.

11. The control system of claim 8, wherein the processor is configured with processor-executable instructions to perform operations further comprising:
closing the interior delivery bay door of the appropriate delivery bay after the vehicle positioned on the vehicle pallet is delivered to the appropriate delivery bay; and
opening the exterior delivery bay door of the appropriate delivery bay only if the interior delivery bay door of the appropriate delivery bay is closed.

12. A method for operating a vehicle vending machine, comprising:
retrieving a vehicle positioned on a vehicle pallet from a storage location within a tower of the vehicle vending machine;
navigating a robotic carrier through a corridor of the vehicle vending machine and to an appropriate one of a plurality of delivery bays of the vehicle vending machine while the robotic carrier carries the vehicle positioned on the vehicle pallet;
opening an interior delivery bay door positioned between the appropriate delivery bay and the corridor only if an exterior delivery bay door positioned between the appropriate delivery bay and an exterior of the vehicle vending machine is closed; and
delivering the vehicle positioned on the vehicle pallet to the appropriate delivery bay through the opened interior delivery bay door.

13. The method of claim 12, further comprising:
receiving, via an exterior door of the tower, a vehicle for storage in a storage location within the tower, the vehicle being positioned on a vehicle pallet;
lifting the vehicle positioned on the vehicle pallet to an appropriate level of the tower with a lift-able shuttle of the tower;
rotating the vehicle pallet to an appropriate orientation; and
placing the vehicle positioned on the vehicle pallet in a storage location.

14. The method of claim 12, wherein retrieving a vehicle positioned on a vehicle pallet from a storage location within a tower of the vehicle vending machine comprises:
retrieving the vehicle positioned on the vehicle pallet from the storage location with a lift-able shuttle;
rotating the vehicle pallet to an appropriate orientation; and
positioning, via an opening of the tower, the vehicle positioned on the vehicle pallet onto the robotic carrier.

15. The method of claim 12, further comprising:
closing the interior delivery bay door of the appropriate delivery bay after the vehicle positioned on the vehicle pallet is delivered to the appropriate delivery bay; and
opening the exterior delivery bay door of the appropriate delivery bay only if the interior delivery bay door of the appropriate delivery bay is closed.

16. A non-transitory computer-readable storage medium having stored thereon processor executable instructions configured to cause a processor of a vehicle vending machine to perform operations comprising:
retrieving a vehicle positioned on a vehicle pallet from a storage location within a tower of the vehicle vending machine;
navigating a robotic carrier through a corridor of the vehicle vending machine and to an appropriate one of a plurality of delivery bays of the vehicle vending machine while the robotic carrier carries the vehicle positioned on the vehicle pallet;
opening an interior delivery bay door positioned between the appropriate delivery bay and the corridor only if an exterior delivery bay door positioned between the appropriate delivery bay and an exterior of the vehicle vending machine is closed; and
delivering the vehicle positioned on the vehicle pallet to the appropriate delivery bay through the opened interior delivery bay door.

17. The non-transitory computer-readable medium of claim 16, wherein the stored processor executable instructions are configured to cause the processor of the vehicle vending machine to perform operations further comprising:
receiving, via an exterior door of the tower, a vehicle for storage in a storage location within the tower, the vehicle being positioned on a vehicle pallet;
lifting the vehicle positioned on the vehicle pallet to an appropriate level of the tower with a lift-able shuttle of the tower;
rotating the vehicle pallet to an appropriate orientation; and
placing the vehicle positioned on the vehicle pallet in a storage location.

18. The non-transitory computer-readable medium of claim 16, wherein the stored processor executable instructions are configured to cause the processor of the vehicle vending machine to perform operations such that retrieving a vehicle positioned on a vehicle pallet from a storage location within a tower of the vehicle vending machine comprises:
retrieving the vehicle positioned on the vehicle pallet from the storage location with a lift-able shuttle;
rotating the vehicle pallet to an appropriate orientation; and
positioning, via an opening of the tower, the vehicle positioned on the vehicle pallet onto the robotic carrier.

19. The non-transitory computer-readable medium of claim 16, wherein the stored processor executable instructions are configured to cause the processor of the vehicle vending machine to perform operations further comprising:
closing the interior delivery bay door of the appropriate delivery bay after the vehicle positioned on the vehicle pallet is delivered to the appropriate delivery bay; and
opening the exterior delivery bay door of the appropriate delivery bay only if the interior delivery bay door of the appropriate delivery bay is closed.

\* \* \* \* \*